(12) United States Patent
Stahle

(10) Patent No.: US 7,302,745 B2
(45) Date of Patent: Dec. 4, 2007

(54) METHOD FOR LOCKING A FIRST TUBE MEMBER TO A SECOND TUBE MEMBER

(76) Inventor: Ragnar Stahle, Svalortsvagen 5, S-459 32 Ljungskile (SE)

( * ) Notice: Subject to any disclaimer, the term of this patent is extended or adjusted under 35 U.S.C. 154(b) by 169 days.

(21) Appl. No.: 11/073,171

(22) Filed: Mar. 5, 2005

(65) Prior Publication Data

US 2005/0186028 A1    Aug. 25, 2005

Related U.S. Application Data

(63) Continuation-in-part of application No. 10/362,767, filed on Feb. 24, 2003, now Pat. No. 7,144,180.

(30) Foreign Application Priority Data

Mar. 7, 2004    (SE)    ................................ 0400565

(51) Int. Cl.
   *B23P 11/00*    (2006.01)
(52) U.S. Cl. .................. 29/434; 403/109.1; 403/374.1; 403/374.2; 403/377
(58) Field of Classification Search ............... 29/426.1, 29/426.5, 434, 436, 469, 525.01; 403/109.1, 403/109.7, 374.1, 374.2, 377; 15/144.1, 15/144.3; 16/429
   See application file for complete search history.

(56) References Cited

U.S. PATENT DOCUMENTS

| | | | |
|---|---|---|---|
| 2,643,143 A | 6/1953 | Bergqvist | |
| 3,355,194 A | 11/1967 | Rasmussen | |
| 4,154,545 A * | 5/1979 | Pinto et al. | ................. 403/104 |
| 5,617,980 A * | 4/1997 | Parsons et al. | ............. 224/251 |
| 6,503,019 B1* | 1/2003 | Wang | ...................... 403/109.1 |

FOREIGN PATENT DOCUMENTS

| | | |
|---|---|---|
| EP | 0 771 954 | 5/1997 |
| GE | 1 018 807 | 10/1957 |
| SE | 135 614 | 12/1950 |
| WO | WO91/07597 | 5/1991 |

\* cited by examiner

*Primary Examiner*—Jermie E. Cozart
(74) *Attorney, Agent, or Firm*—Rolf Fasth; Fasth Law Offices

(57) ABSTRACT

A locking arrangement includes an inner element (1) and an outer element (3), (302), where the inner element (1) is axially shiftable relative to the outer element (3), such as a shaft of a tool, one end of the outer element (3), (302) has a locking member (4) for locking the inner element (1) and the outer element (3), (302) relative to one another, the locking member (4) is maneuverable by a maneuvering member (5) that is remote from the locking member (4) in a direction toward another end of the outer element (3), (302) via an affecting member (301) that is shiftable along or rotatable about an axis that is parallel to a lengthwise axis of the outer element so that the affecting member has a tube (301) that completely or partially encloses the outer element (302).

6 Claims, 22 Drawing Sheets

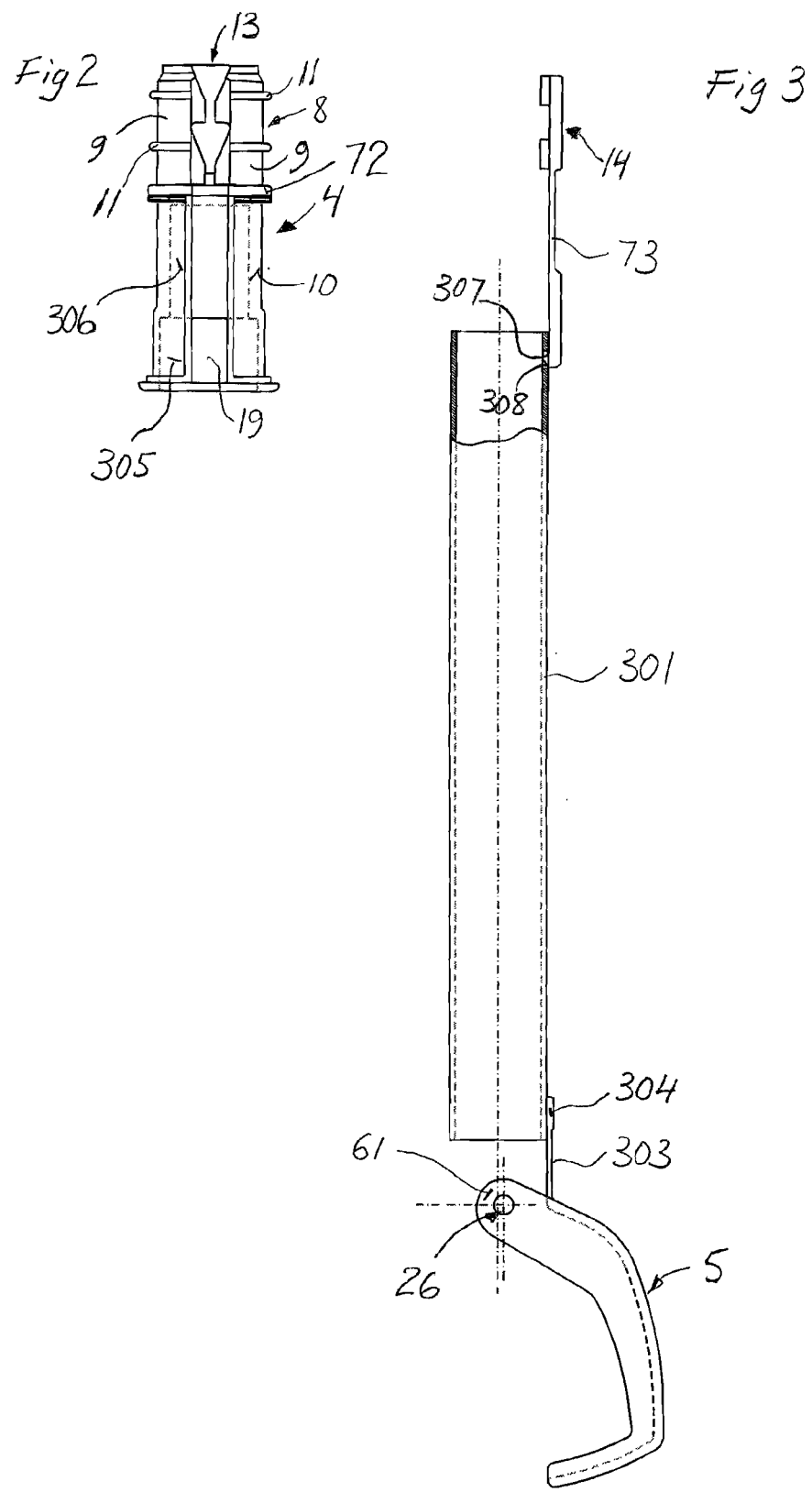

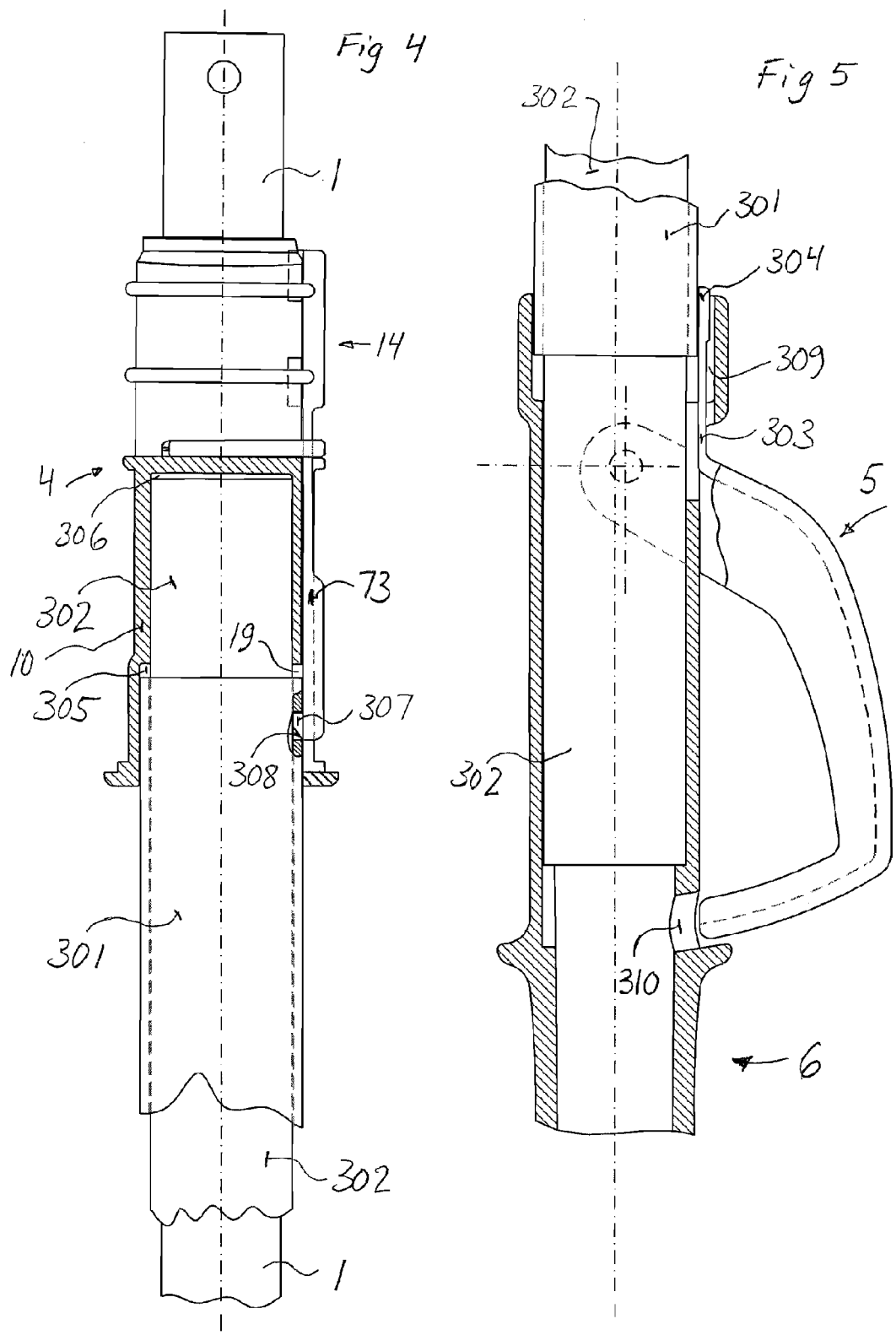

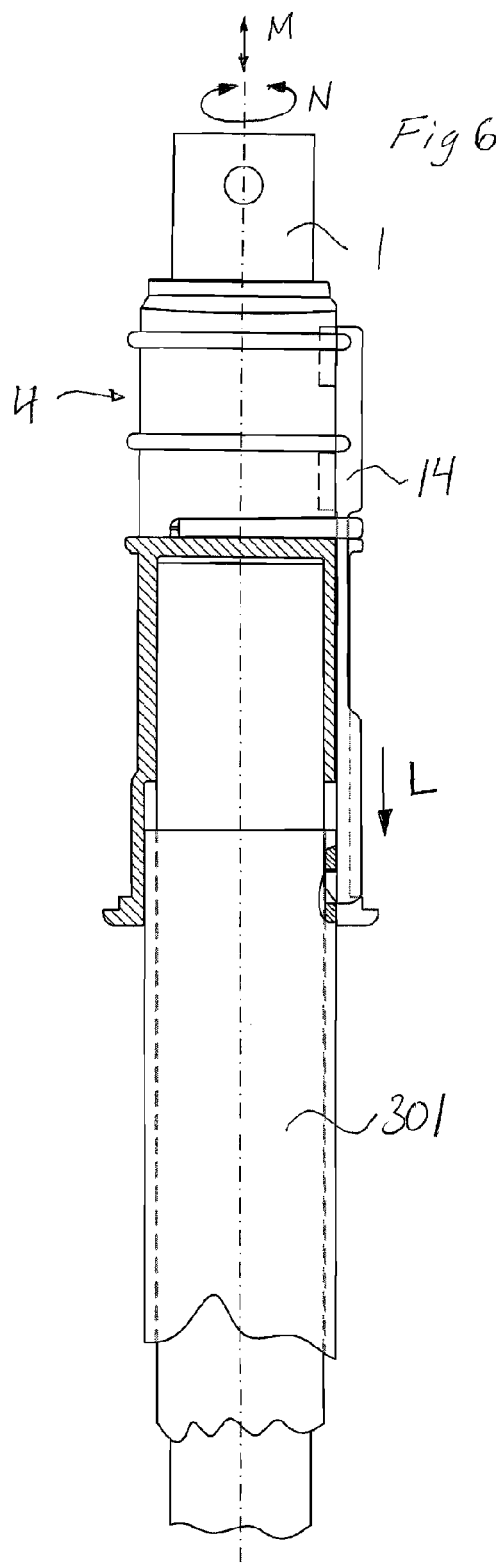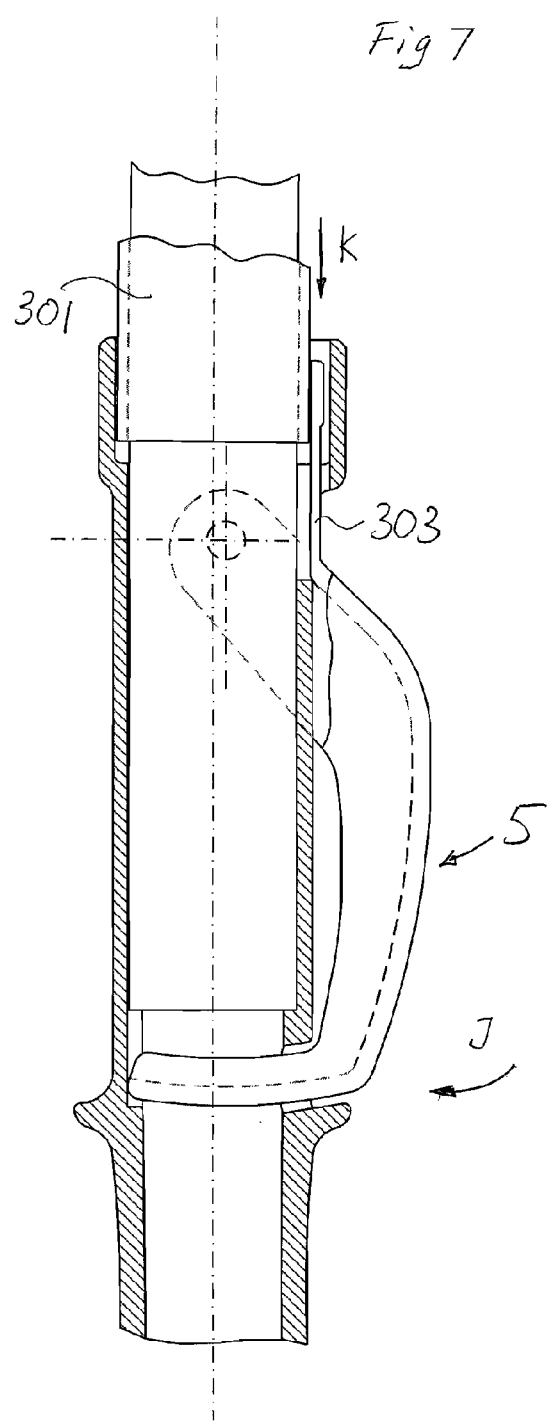

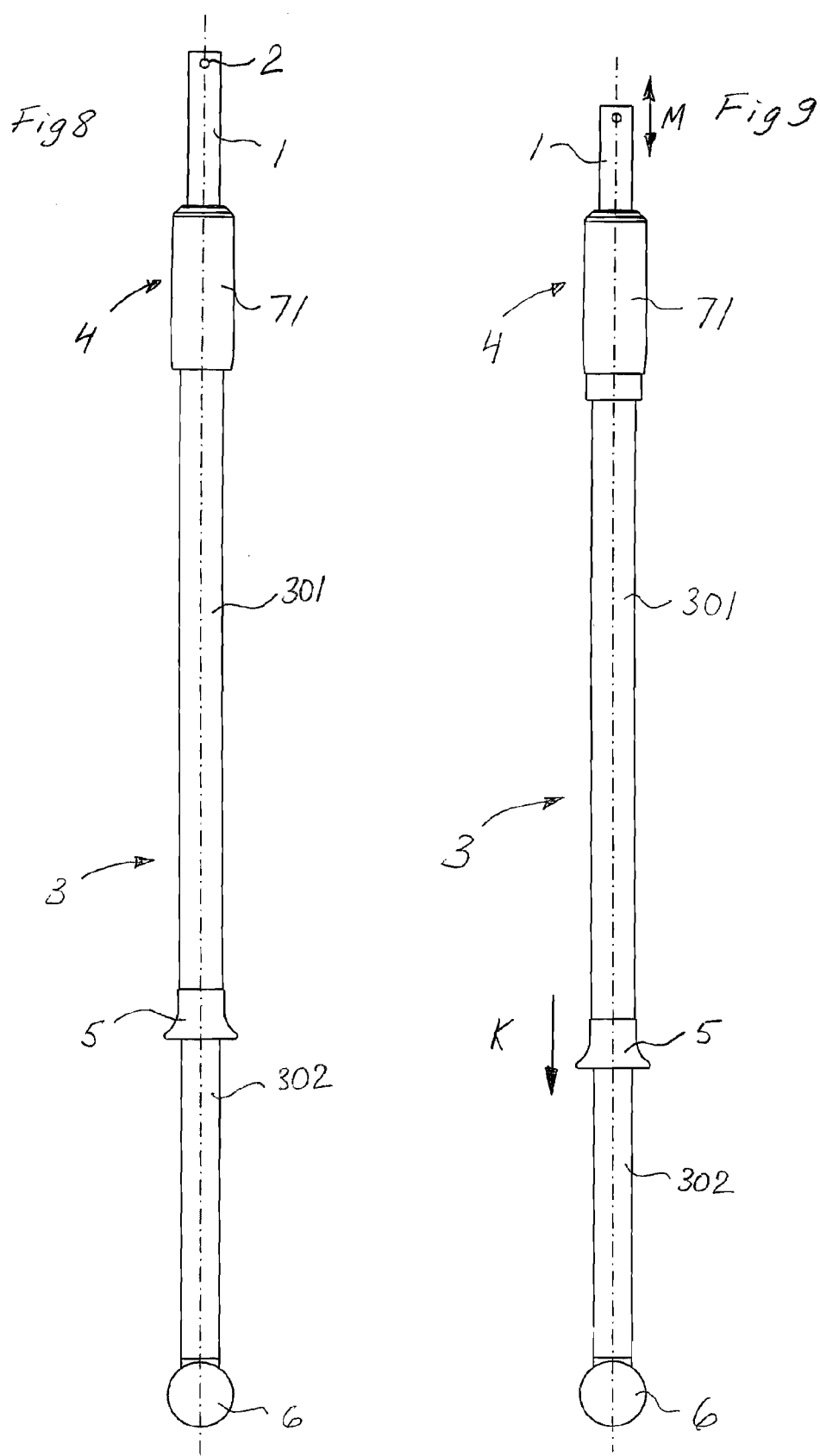

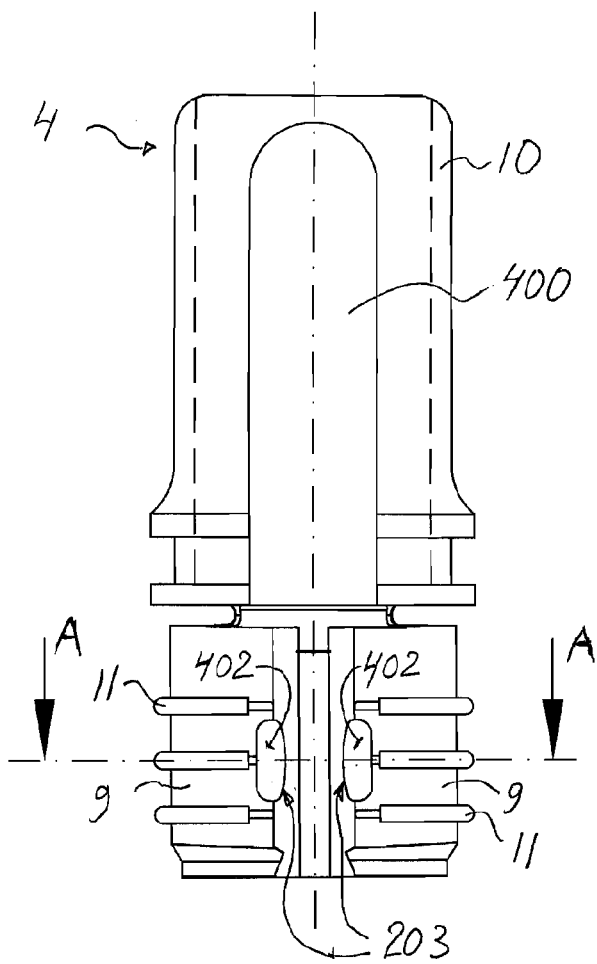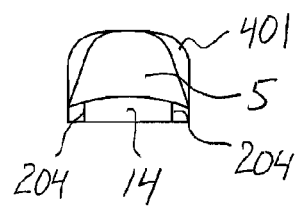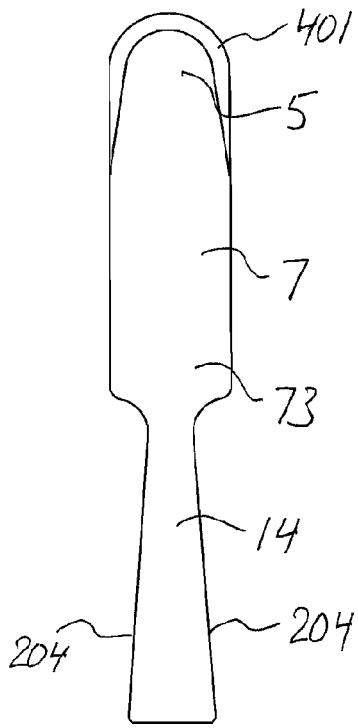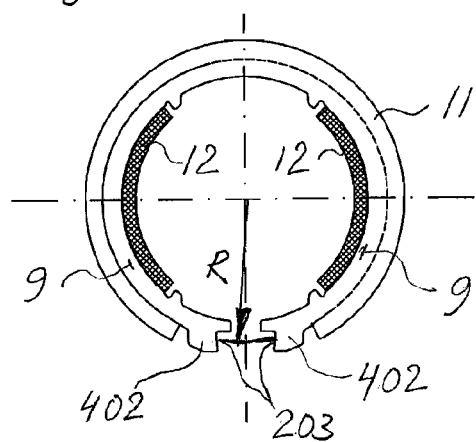

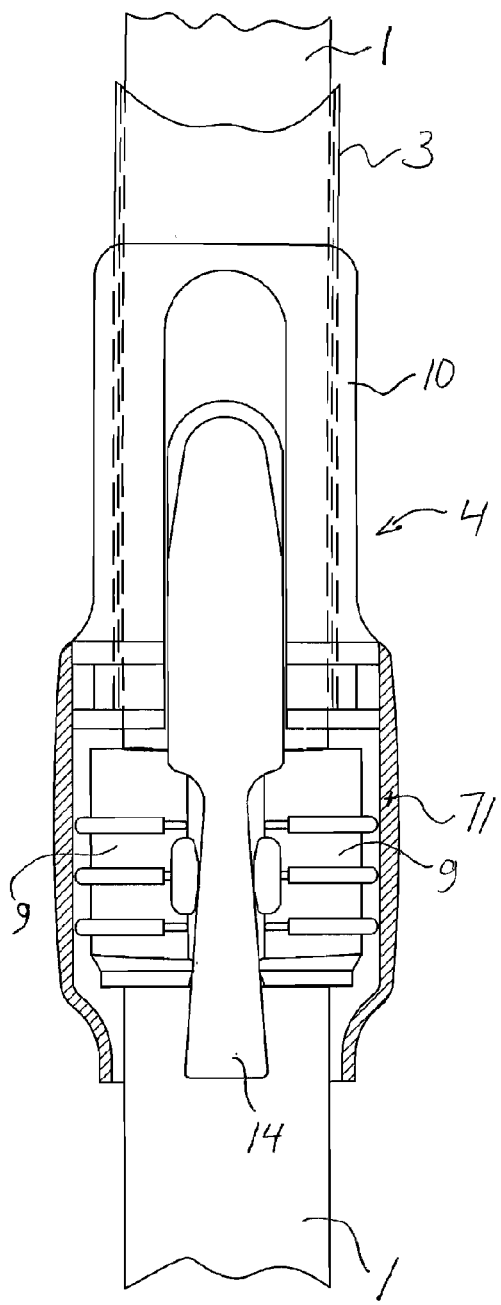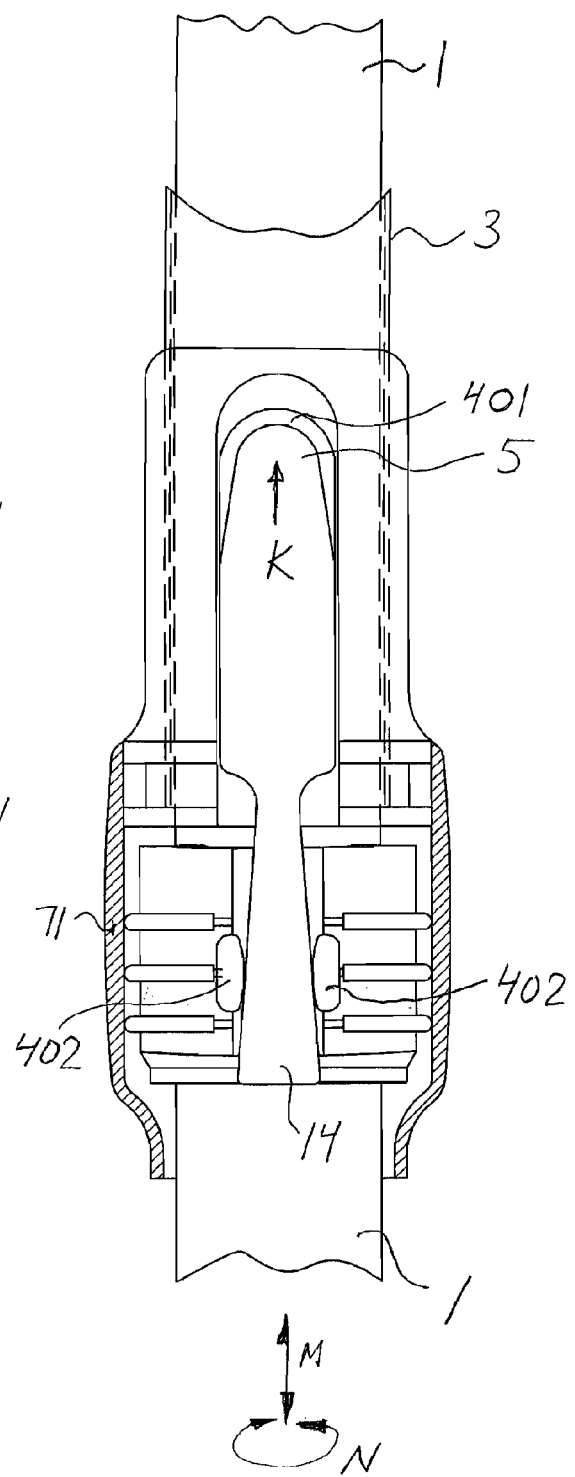

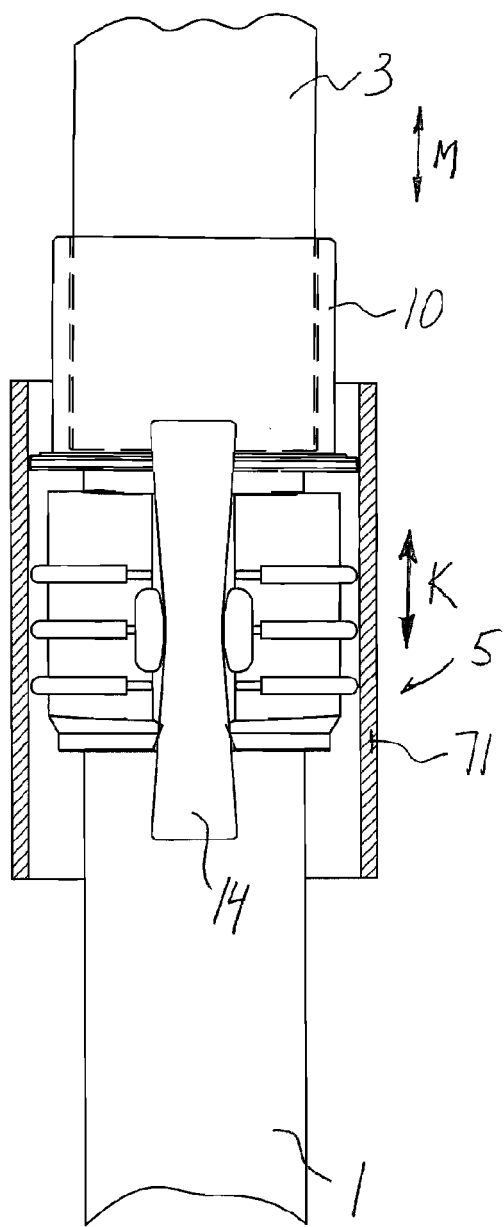
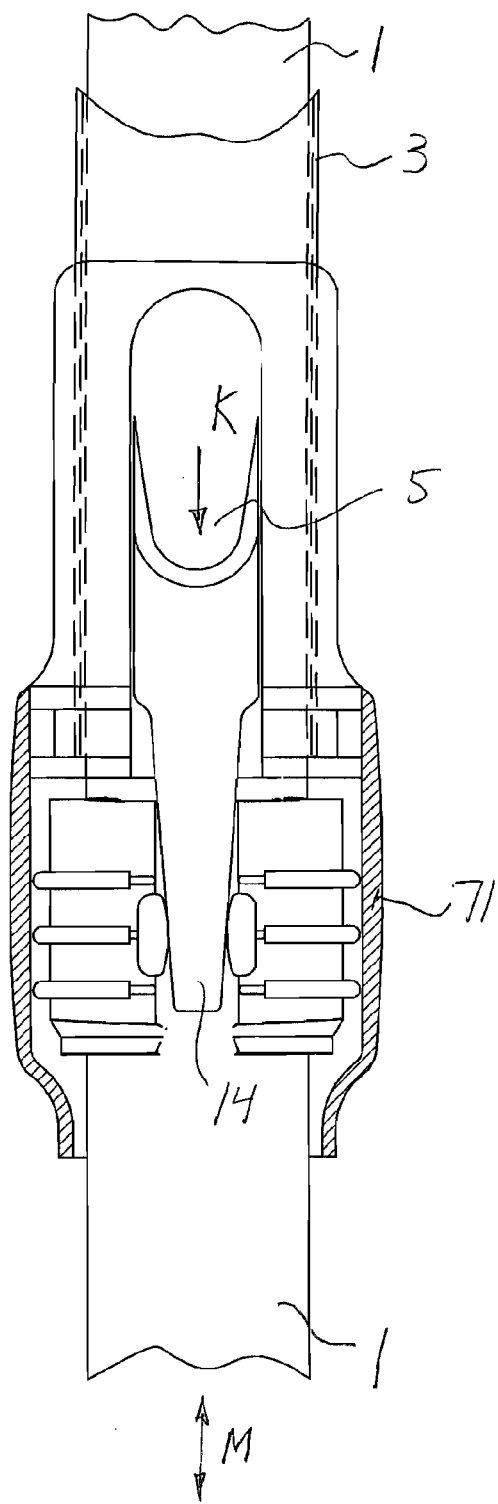

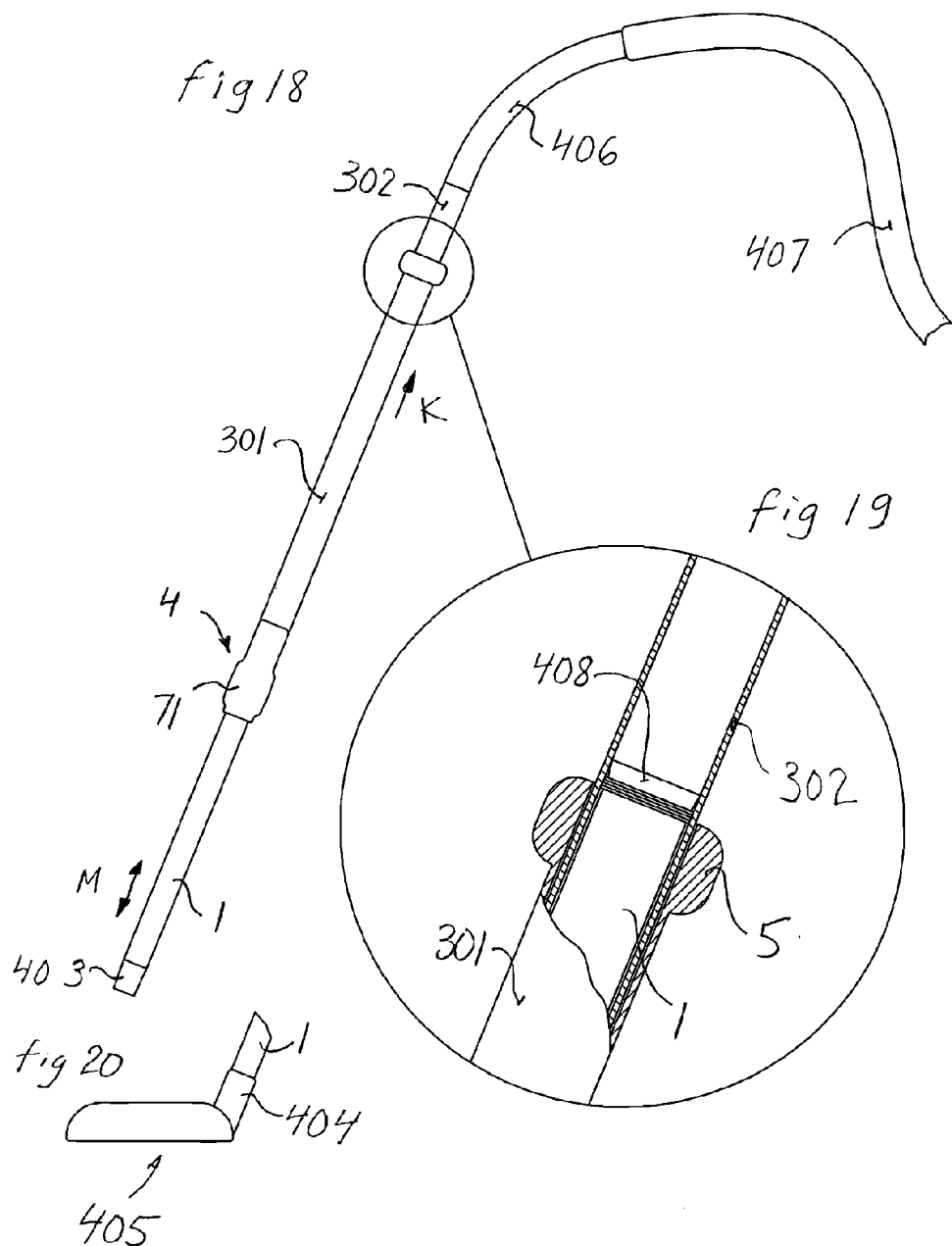

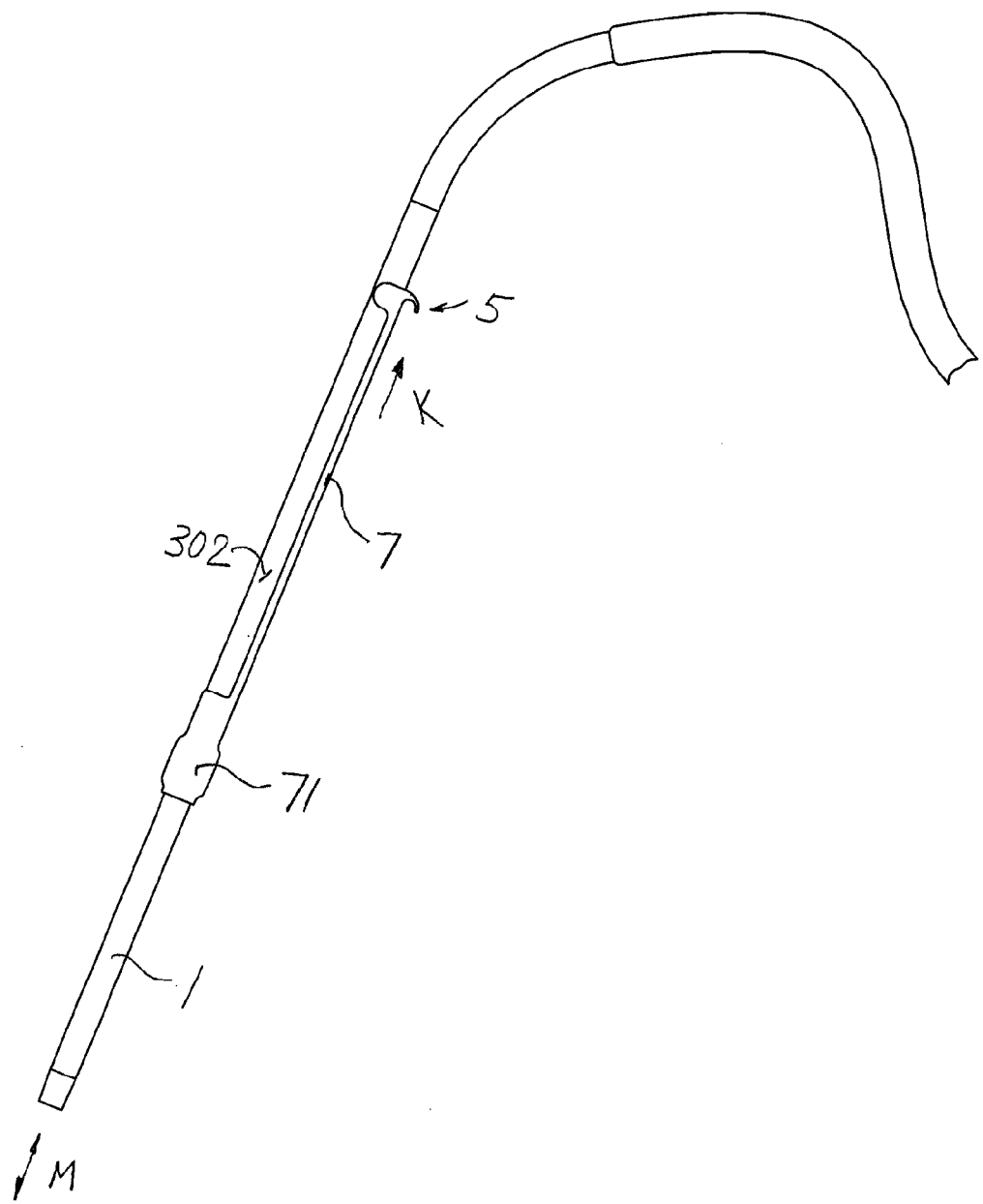

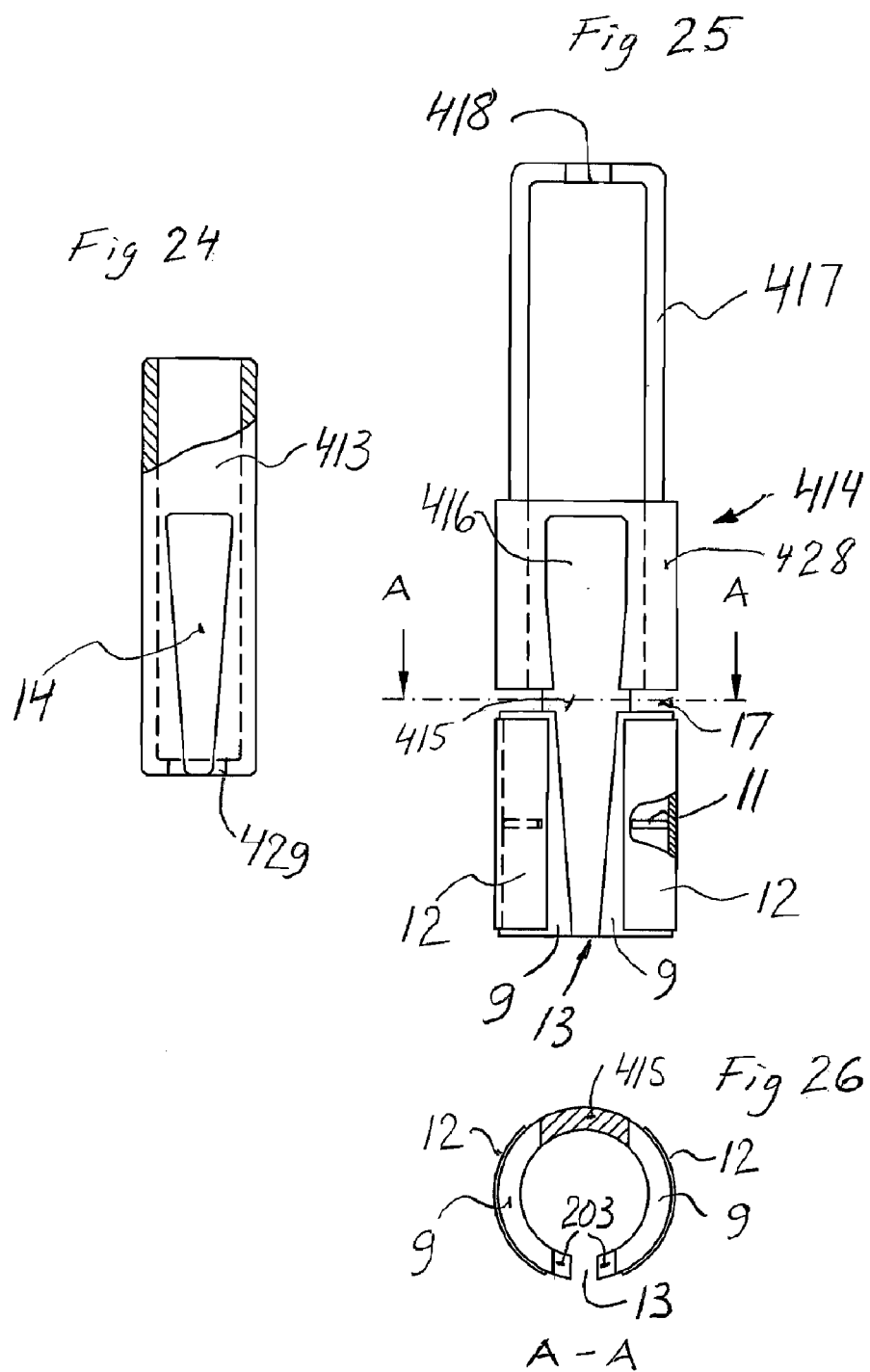

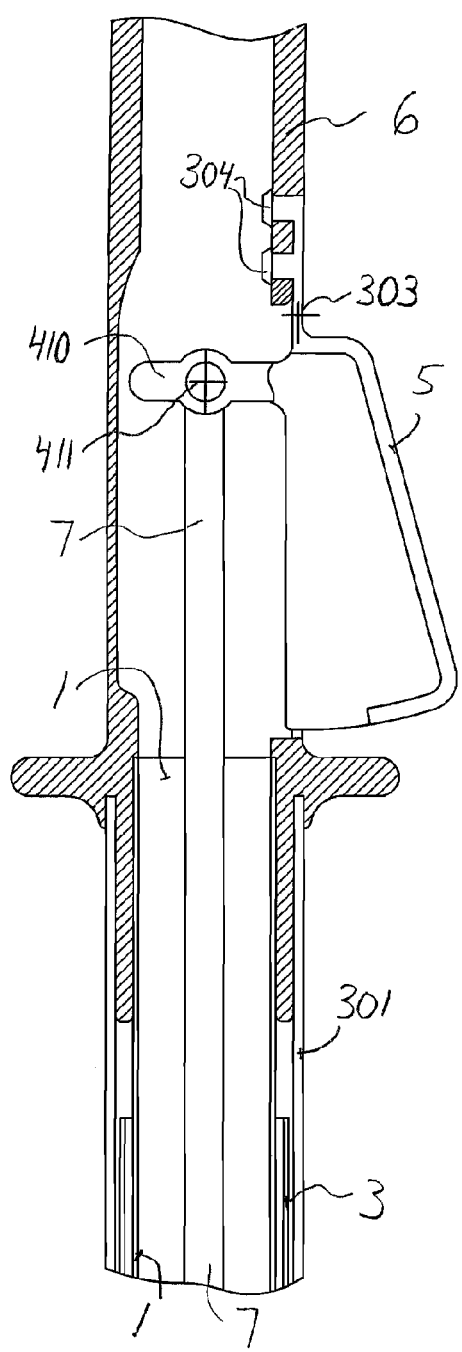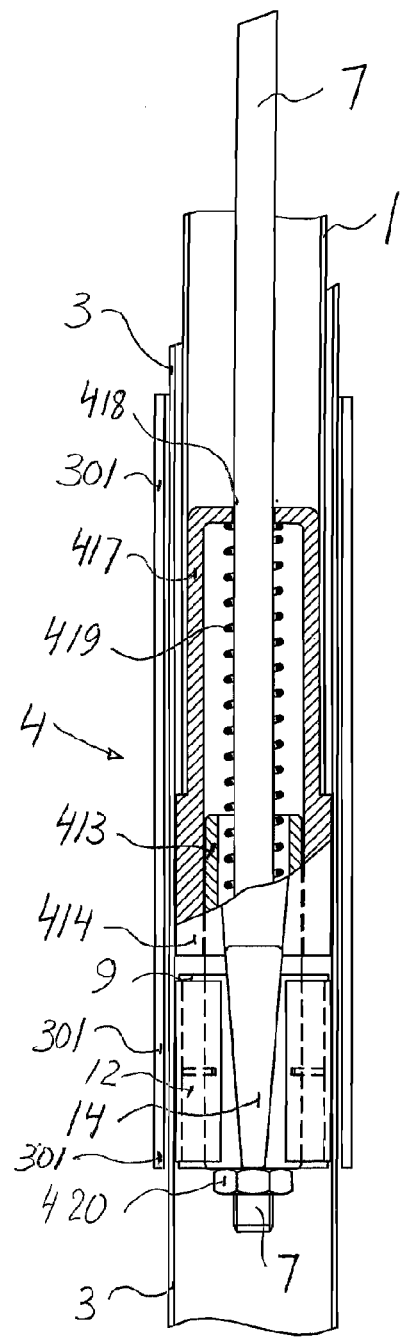

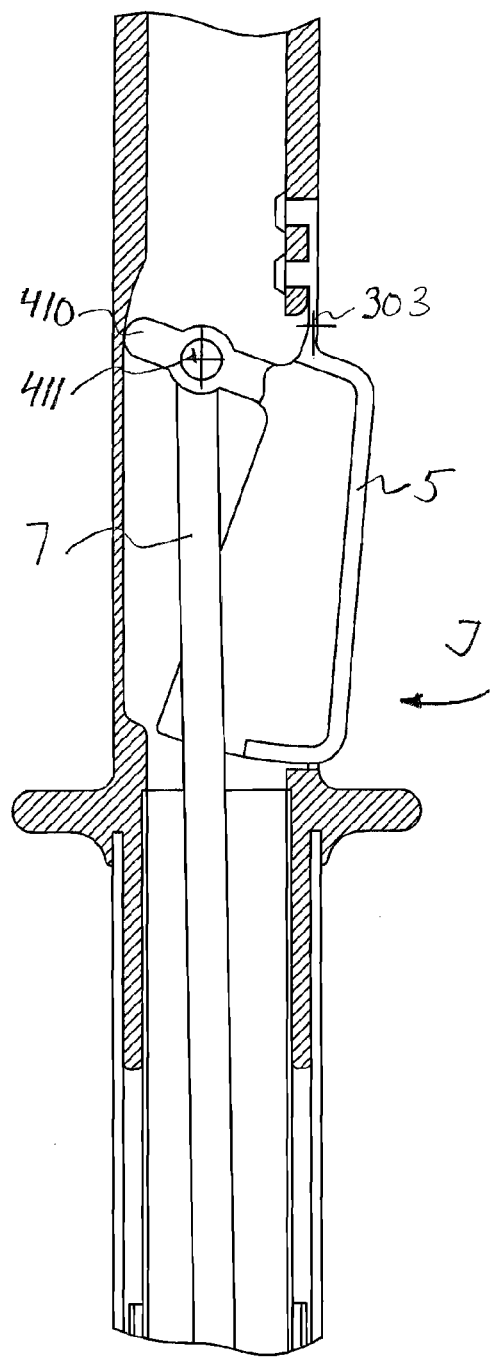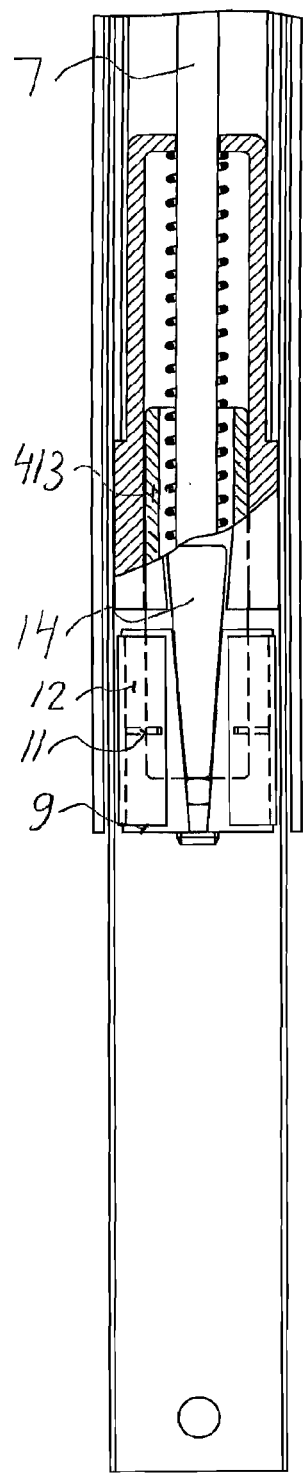

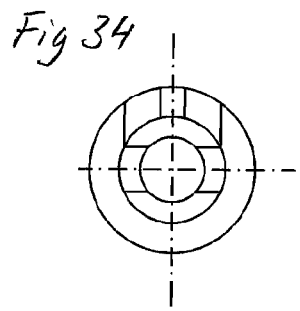
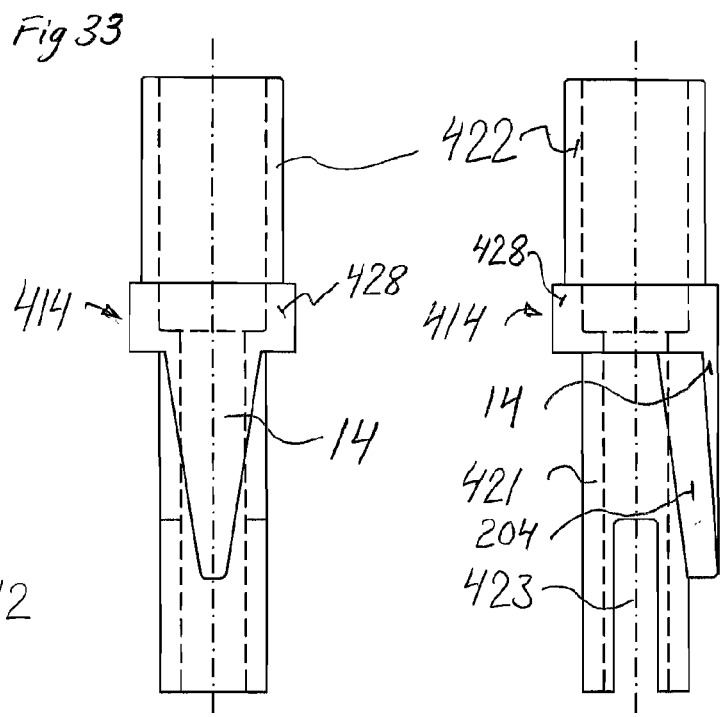
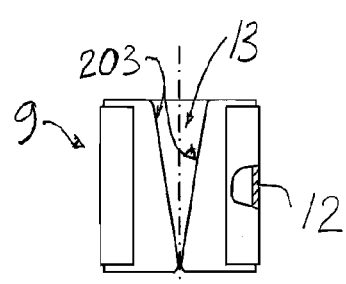
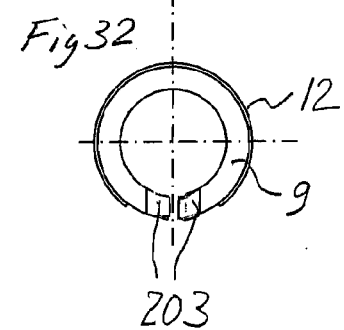
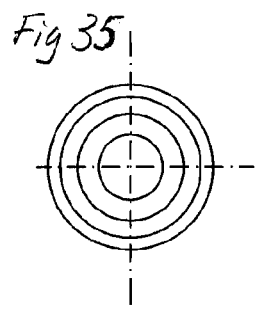

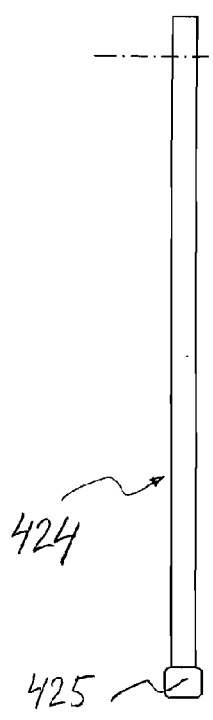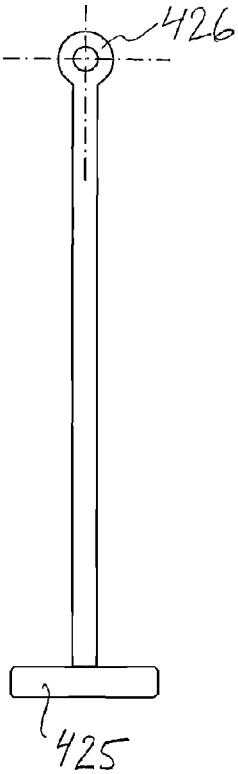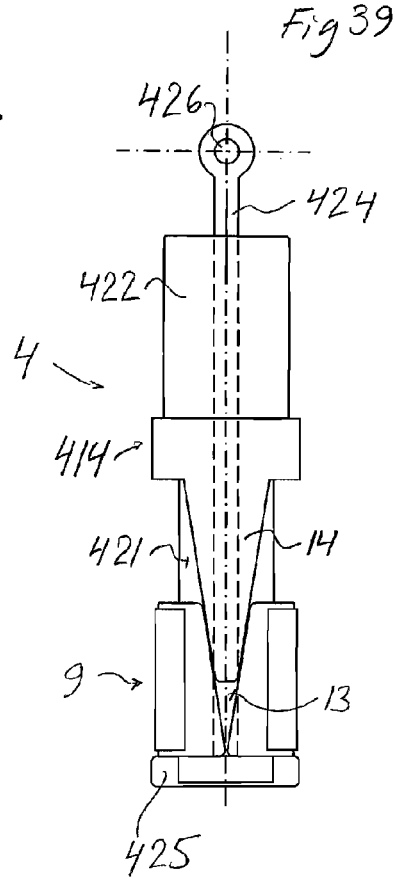

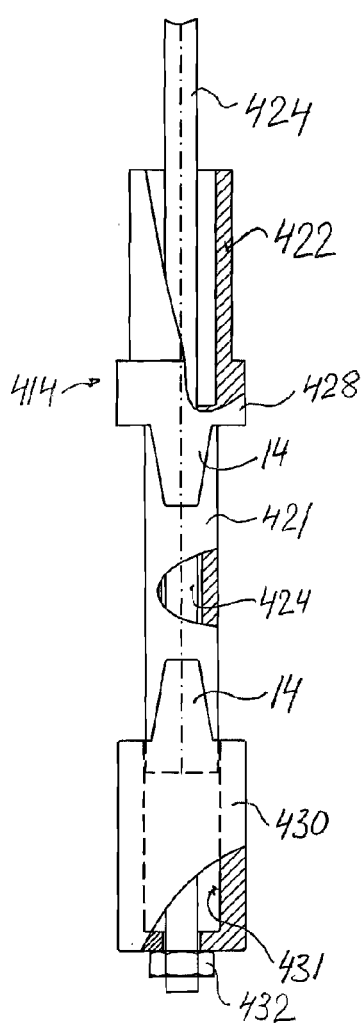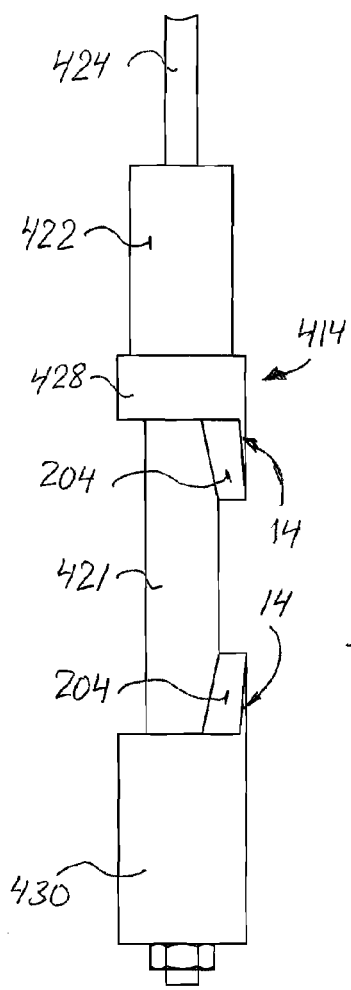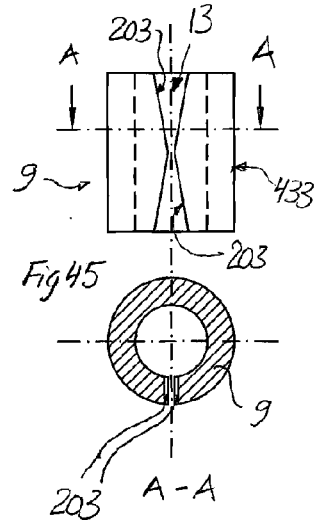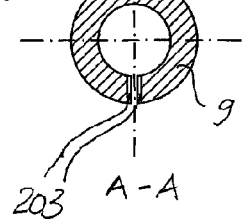

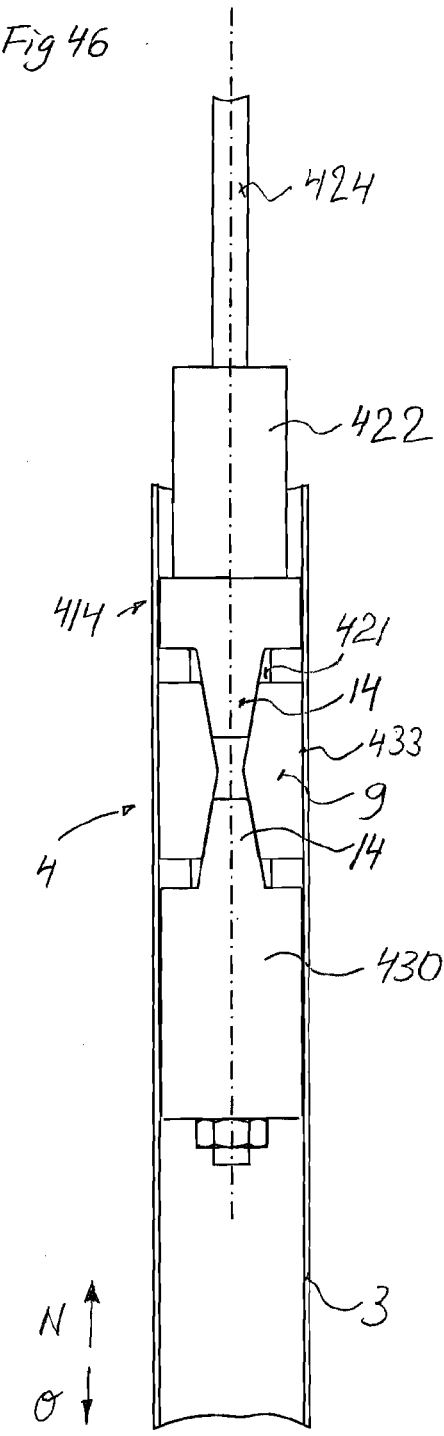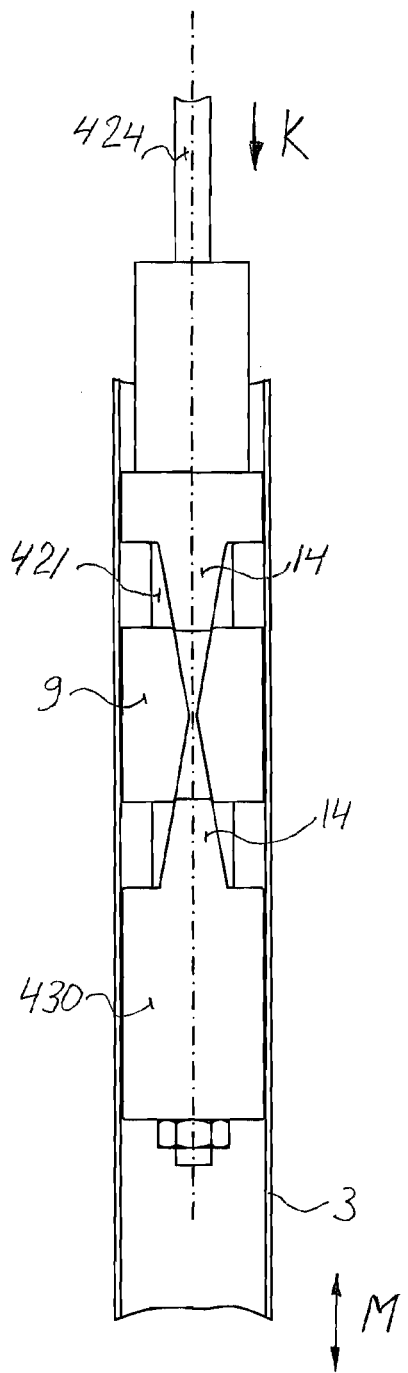

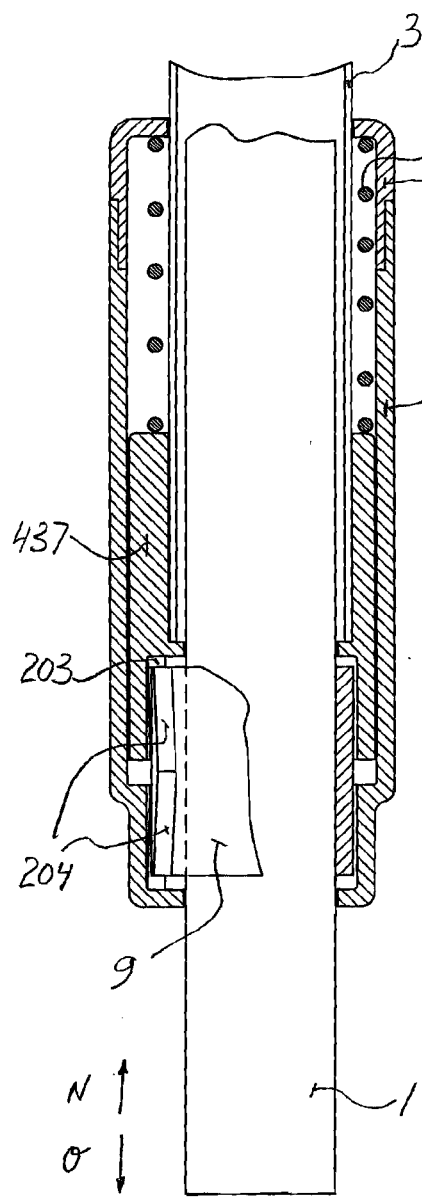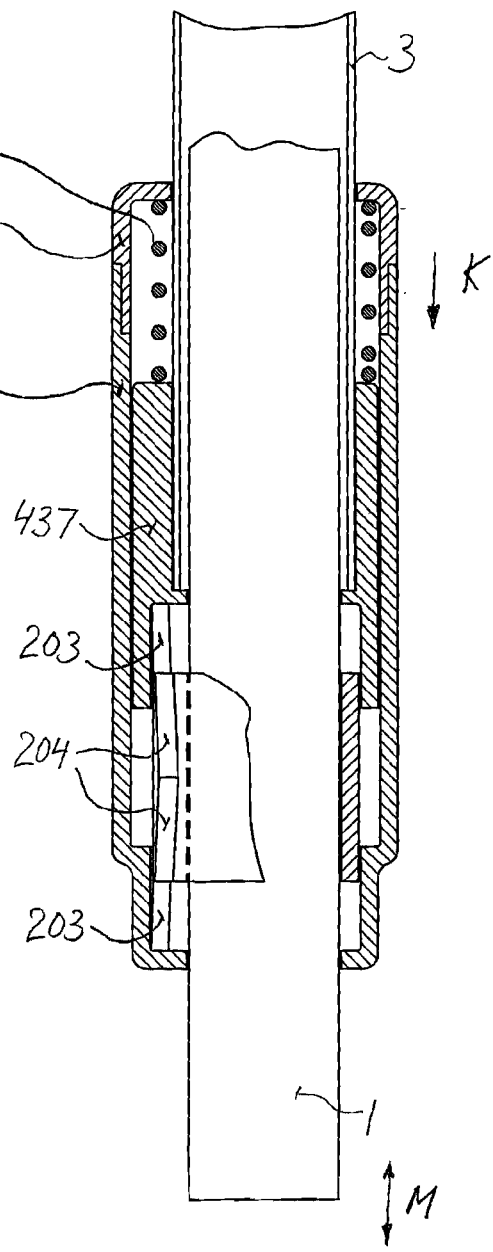

METHOD FOR LOCKING A FIRST TUBE MEMBER TO A SECOND TUBE MEMBER

Prior Application

This is a continuation-in-part application that claims priority from U.S. patent application Ser. No. 10/362,767, filed 24 Feb. 2003 now U.S. Pat. No. 7,144,180 and the application also claims priority from Swedish patent application no. 0400565-8, filed 7 Mar. 2004.

TECHNICAL FIELD

The invention related to a locking arrangement with two elements that are slidable into one another such as a shaft for a tool where the length is adjustable. The shaft has a locking member at an outer element of one end. The locking member is maneuverable with a maneuvering member that is at a distance from the locking member in a direction towards the other end on the outer element via an affecting member that is slidable along or rotatable about an axis that is parallel to the longitudinal axis of the outer element.

STATE OF THE ART

In WO 02/18802A1 an arrangement is described that is mainly adapted for a tool shaft that has a telescopic function. The arrangement includes a tubular shaped element, an inner and an outer, that can be locked relative to one another. The locking is done with the help of a locking member that is securely mounted on the end of the outer element. The opening of the lock is done with the help of a maneuvering member at the other end of the outer element. The transfer of the opening forces is done with the help of an affecting member between the two ends on the outer element. In the description a number of different variations of affecting members are suggested. The preferred embodiment of the affecting member is a thin steel band that is inserted between the inner and the outer elements.

This embodiment functions well but is costly to produce. Not only is the cost for the band that requires openings and cutting high but also the mounting is cumbersome and time-consuming. None of the remaining variations of the affecting members that are hitherto known result in any substantial reduction of the production costs. In addition to the locking details, the tube system accounts for a major portion of the costs. Especially the outer element is costly. One reason is the demanding requirements of durability and the surface on the outer tube. The outer element is usually manufactured of hardened aluminum that has been surface treated in a certain way. It must be able to endure normal handling without being damaged which requires a thickness of at least one millimeter. Furthermore, it is desirable that the surface is painted since it is used for gripping. Anodized surfaces are also used but are experienced as being cold to hold.

DESCRIPTION OF THE INVENTION

The object of the present invention is to achieve an arrangement according to the ingress that makes it possible to manufacture at substantially lower costs compared to earlier known variations.

This object is achieved by the locking arrangement that has two elements that are slidable into one another such as a shaft for a tool where the length is adjustable. The shaft has a locking member at an outer element of one end. The locking member is maneuverable with a maneuvering member that is at a distance from the locking member in a direction towards the other end on the outer element via an affecting member that is slidable along or rotatable about an axis that is parallel to the lengthwise axis of the outer element. The affecting member includes a tube that is made of a polymeric material. The tube encloses the outer element and the outer element has a thin walled, untreated tube of metal, preferably hardened aluminum.

The invention will be described in more detail with reference to the attached drawings that are intended to explain but not limit the invention whereas FIG. 1 is a shortened side view showing a tool shaft with an arrangement according to the invention.

FIG. 2 is a side view showing mainly the locking member.

FIG. 3 is a side view showing details of the opening system of the lock.

FIG. 4 is a partly opened side view showing the upper part of the arrangement according to FIG. 1 in a locked position.

FIG. 5 is a partly opened side view showing the lower part of the arrangement according to FIG. 1 in a locked position.

FIG. 6 is a partly opened side view showing the upper part of the arrangement according to FIG. 1 in a released position.

FIG. 7 is a partly opened side view showing the lower part of the arrangement according to FIG. 1 in a released position.

FIG. 8 shows a side view of an arrangement with a pulling maneuvering member in a closed position.

FIG. 9 shows an arrangement according to FIG. 8 in an open position.

FIG. 10 is a side view that mainly shows the locking member.

FIG. 11 is a cross sectional view of the locking member according to FIG. 10 in the direction of the arrows A.

FIG. 12 is a side view that shows a wedge, affecting member and maneuvering member.

FIG. 13 is a view of the component according to FIG. 12 seen from below according to European view positioning.

FIG. 14 is a partly opened side view that shows the locking member according to FIG. 10, the arrangement according to FIG. 12, mounted on the outer element that is in a locked position with an inner element.

FIG. 15 shows the arrangement according to FIG. 14 in a released position.

FIG. 16 is a partly opened side view that shows a locking member mounted on an outer element and with a secured locked inner element where the wedge has an alternative shape.

FIG. 17 is an arrangement according to FIG. 14 with the exception that the wedge is turned in the opposite direction.

FIG. 18 is a side view showing a vacuum cleaner shaft with a bent tube and hose and with a locking arrangement according to the invention.

FIG. 19 is a partly opened enlargement of the encircled portion of FIG. 18.

FIG. 20 is a partial side view showing the lower part of the vacuum cleaner shaft with a vacuum cleaner nozzle mounted thereon.

FIG. 21 is a side view according to the arrangement in FIG. 18 and shows an alternative embodiment of the affecting member and the maneuvering member.

FIG. 24 is a partially opened side view of a wedge arrangement.

FIG. 25 is a partially opened side view showing a sleeve with clamping jaws.

FIG. 26 is a cross section of the sleeve according to FIG. 25 along the cross sectional line A-A in which the view position is according to European drawing standards.

FIG. 27 is an enlarged portion of an upper part according to FIG. 22.

FIG. 28 is an enlarged portion of a lower part according to FIG. 23.

FIG. 29 is an upper part according to FIG. 27 in a released position.

FIG. 30 is a lower part according to FIG. 28 in a released position.

FIG. 31 is a partially broken out side view showing a clamping jaw.

FIG. 32 is a top view showing the clamping jaw according to FIG. 31, in which the view position is according to European drawing standards.

FIGS. 33, 34, 35 and 36 are views shown a sleeve with an integrated wedge in which the view position is according to European drawing standards.

FIGS. 37 and 38 are views showing a pulling bar in which the view position is according to European drawing standards.

FIG. 39 is a side view showing the sleeve according to FIG. 33 including an attached clamping jaw and pulling bar according to FIGS. 31 and 38.

FIG. 42 is a partial front cross section shown a lower sleeve put over an upper sleeve with a pulling rod.

FIG. 43 is a side view of the arrangement according to FIG. 42 in a view position according to European drawing standards.

FIG. 44 is a side view showing a clamping jaw.

FIG. 45 is a cross section of the clamping jaw according to FIG. 44 along the cross sectional line A-A, in a view position according to European drawing standards.

FIG. 46 is a front view of the arrangement according to FIG. 42 with a clamping jaw mounted thereon according to FIG. 44 where the arrangement is inserted into an opened tube and is in a locked position.

FIG. 47 is an arrangement according to FIG. 46 in a released position.

FIG. 55 is a partially opened side view of the locking arrangement in a locked position.

FIG. 56 is an arrangement according to FIG. 55 in a released position.

Figure 1:
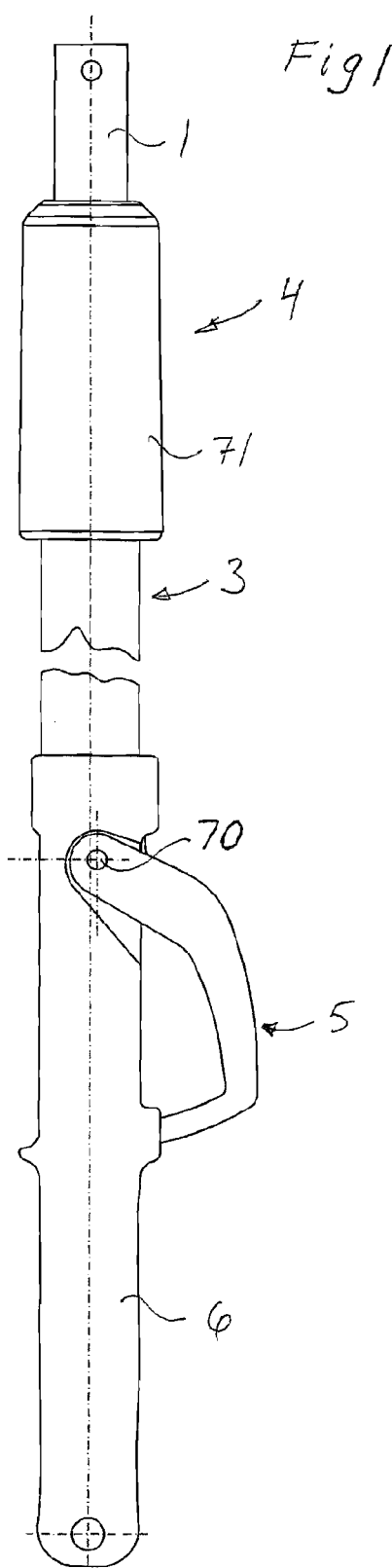

FIG. 1 shows an arrangement of a tool shaft that includes an inner element 1 with a connection opening 2 for connecting a suitable tool. The inner element 1 is removably locked to the outer element 3 with the help of a locking member 4 that is enclosed by a protection housing 71. The lower part of the outer element 3 has a handle mounted thereon that has swingable peg 70 on which a U-shaped maneuvering member 5 is rotatably hooked. The outer element has an inner metal tube and an outer plastic tube that encloses the metal tube. The plastic tube has the double function to provide a desirable surface and also to be an affecting member. The opening forces of the maneuvering member 5 with the help of the plastic tube is transferable to the locking member 4 which function will be explained in more detail below in the description. FIG. 2 shows the locking member in a side view. It is substantially identical to the locking member shown in FIGS. 2-5, 39-41 and 45 of WO 02/18802A1. The difference is that the attachment collar 10 is extended with a flange forming a space 305 in which the outer tube can freely move. The flange has a groove 19 for receiving an engagement tap according to the following description. The opening system shown in FIG. 3 includes a wedge 14, an outer plastic tube 301 and a maneuvering member 5. The wedge 14 includes, according to known technology, two wedge elements that cooperate with corresponding wedge grooves in the groove 13 (in FIG. 2) and an extension 73 that is terminated by an engagement peg 307. The outer tube 301 is preferably made of extruded polypropylene which can be reinforced and colored. This means that a heat insulated, impact durable surface is provided that has the desired colors. The cost for this outer tube is comparable to the cost for a varnish layer on an aluminum tube. The tube 301 has its upper end including an opening 308 into which the engagement peg 307 is inserted. The described locking member requires about 120 N in pulling force. However, the dimensions of the opening 308 that are here considered, the pressure on the opening despite this so low that the polypropylene material is not overloaded during the relatively short opening process. The maneuvering member 5 that is shown in FIG. 3 is preferably made by injection molding in a suitable plastic material and is thus shaped like a bent U-profile with two flanges 61. Through holes 26 are defined in the flanges. These holes 26 define a rotation center for the maneuvering member 5. The maneuvering member is provided with an extension 303 that is made in the same piece as the maneuvering member which is very advantageous. The extension 303 includes at its uppermost end a protrusion 304 that can be provided with an engagement peg that is hooked into the corresponding holes in the tube 301. It is preferred though that the protrusion 304 has a smooth underside that is welded on the tube 301. FIG. 4 shows how an inner tube 1 is inserted through the locking member 4 and through an inner metal tube 302 preferably made of a hardened aluminum. The inner metal tube 302 is inserted into the opening 306 at the attachment collar 10 and thus securely attached to the locking member 4. At its lower end, the tube 302 is inserted into the corresponding bottom hole in the handle 6, according to FIG. 5. The tube 302 has the function of keeping the handle 6 together with the locking member 4 and thereafter to absorb axial forces and rotating and bending momentum. Further, the tube 302 has a channel for the inner tube 1. The outer plastic tube 301 is put over the tube 302 with a certain play that enables axial sliding of the tube 301 relative to the tube 302. The upper end of the tube 301 is inserted with a play into a tube shaped space 305 in the attachment collar 10. Through an opening that is in the form of a track 19 in the attachment collar 10 is the engagement peg 307, on the extension 73 of the wedge 14, hooked in the opening 308 of the tube 301. The wedge 14 can thus be drawn in an axial direction by the tube 301. The wedge 14 is thus held in place by the protection housing 71 (not in figure) that permits the wedge to move with a certain play without falling out of the track 13 (according to FIG. 2). In the lower part, the tube 301 is inserted into a tube shaped flange in the handle 6 with a certain play. The flange is equipped with an axial groove 309 that provides a space for the protrusion 304 on the extension 303 of the maneuvering member 5. During the opening process, the protrusion 304 can therefore freely move in the axial direction but still be supported on the sides so that the rotation momentum on the tube 301 is taken up in the handle 6 and is transferred via the tube 302 to the locking member 4. The locking member 4, when in the locked position, transfers the rotation momentum to the inner element 1. As mentioned earlier, it is preferred that the protrusion 304 is welded on the tube 301. This is suitably done by using ultrasound welding after the components have been mounted. In this way, the tolerances of the dimensions of the included components that affect the length of the opening of the wedge 14 can be eliminated. The groove 309 is upwardly open so that the protrusion 304 can be inserted therethrough. Further, the groove 309 can be provided with an outward hole, in the right direction on FIG. 5 (not shown), so that the weld spot can be inserted therethrough. The maneuvering member is put over outside swingable pegs. An upper portion of the maneuvering member has a clamp that during the opening process is turned into the groove 310 in the handle 6. The handle 6, as in FIG. 5 is only partly shown, is preferably made in one piece by injection molding in a suitable polymeric material such as polypropylene.

FIGS. 6 and 7 show an upper and lower part of the arrangement in a released position. When the maneuvering member 5 is pushed in the direction of the arrow J the extension 303 is pulled in the direction of the arrow K. The extension 303 is thus bent. This does not lead to fatigue problems if a suitable plastic material is used. The extension 303 pulls the tube 301 in the direction of the arrow K. Thus the wedge 14 is pulled in the direction of the arrow L and the locking member 4 is released so that the inner element 1 can be freely slide and be turned in the direction of the arrows M and N, respectively. When the maneuvering member 5 is released the spring element in the locking member 4 returns the system, the wedge 14, the tube 301 and the maneuvering member 5 in the unaffected position, according to FIGS. 4 and 5.

An important aspect of the present invention is the surprising but advantageous effect of the combination of the inexpensive plastic tube 301 and the inexpensive metal tube 302 where the plastic tube has the double function of providing a desirable surface for the purpose and also be an affecting member with which help the opening forces from the maneuvering member 5 can be transferred to the locking member 4. The plastic tube 301 can be relatively thin walled, about 1.5 mm is preferred if the wedge 14 is to be attached to the tube 301 according to the description above. In the case when the extension 73 of the wedge 14 is welded on the tube 301 the thickness of the piece can be reduced. The plastic tube has a low weight and cost but provides despite this a powerful impact protection for the metal tube 302 that can therefore be thin walled and thus have a low weight and cost. It is especially advantageous for the production cost that no surface treatment of the tube 302 is required. The total effect of this inclusive the substantial reduction of the assembly time is that the production costs are 30-40% compared to know technique.

The invention has in the above description been used on a special type of locking member but can of course be used on a wide range of types of the locking member that permit maneuvering of the distance of the locking function. Further, the invention can be further varied within the scope of the patent claims that is obvious to the person of ordinary skill in the art.

The invention can within the scope of the patent claims be further varied as follows. FIGS. 8 and 9 show side views of an arrangement with a pulling maneuvering member in a closed and open position, respectively. The arrangement includes as described earlier an inner element 1 which can be provided with a connection hole 2 for attachment of a suitable tool. The inner element 1 is removably locked to the outer element 3 with the help of a locking member 4 enclosed by a protection housing 71. The outer element includes an inner metal tube 302 and an outer plastic tube that encloses the metal tube. The plastic tube, that has the function according to the earlier description, can be terminated by a pulling flange 5 which serves as the maneuvering member. Without the pulling flange a major part of the tube 301 can function as the maneuvering member.

A pulling maneuvering member assumes that the transfer forces are substantially lower than 120N. A lower maneuvering force on the locking type that is her described can be achieved by reducing the wedge angle on the wedge 14. Empirical tests have shown that an angle between the wedge surfaces of about 10 degrees and with a polyamide plastic in the wedge and acetal plastic in the opposing surfaces the maneuvering force can be reduced to about 30-40 N without causing the components to be stuck. This is an easily applicable force for the grip that is here considered. For shape-dependent lock types the pulling forces can be further reduced.

When this arrangement is used as a tool shaft the user grabs the handle with one hand and the plastic tube 301 with the other hand. The arrangement is then usually turned so that the handle 6 is on top. When working with a tool, such as mopping of a floor with a mop shaft the upper hand rests on the handle 6 while the lower hand is placed in a suitable position on the tube 301. This position depends on the individual and on the work position. To be able to achieve a sufficient leverage arm a minimum distance of about 20 cm is required. For a tooling shaft this means that there generally is a portion of the upper part of the shaft, below the handle, that is seldom gripped by the user. This of course assumes that the length of the shaft can be adjusted. The plastic tube 301 can thus be terminated a bit below the handle 6 which saves weight and reduces the production costs even if some type of surface treatment of the visible part of the tube 302 is desirable.

During adjustment, the operator moves his lower hand up towards the maneuvering member 5 and pulls this in the direction of the arrow K against resistance from his upper hand on the handle 6. The locking member 4 is thus released so that the inner element 1 can freely be slid in the direction of the arrow M. Because the force requirement is relatively low, the operator can also choose to keep his lower hand in the grip position about the tube 301 and pull this upwardly. The adjustment can thus be done without changing the grip. Even if the operator moves his lower hand to the pulling flange 5 this is done with an almost unchanged grip because the hand can control the shaft while the hand glides along the tube 301. The maneuvering during the ongoing work can thus be done substantially easier compared to using a maneuvering member for the upper hand. During locking, the operator releases the pulling grip about the tube 301. In this way, the spring element in the locking member 4 returns the system, the wedge 14, the tube 301 and the maneuvering member 5 to an unaffected position. The maneuvering distance for this described locking type with the above mentioned wedge angle is about 20 mm. The space between the maneuvering member 5 and the handle 6 of course makes it possible to use long maneuvering distances. This is a great production technical advantage because the locking arrangement is insensitive to tolerances on the cutting length of the tube. An additional production technical advantage is the simple construction with few easily assembled components.

The invention can be varied in a many different ways within the scope of the patent claims. For example, the tube 301 can be shorter than what is shown in FIGS. 8 and 9. For example, one could imagine that the tube is made to the protection housing 71 by letting the protection housing be axially shiftable and function as the maneuvering member 5. Even if a polymeric material is preferred the tube 301 can of course be made of other materials such as metal. A low maneuvering force makes it possible to use a material with a relatively low stiffness and durability such as a renewable material. Further the tube 302 can be made by another material than metal such as a polymeric material or a renewable material. Further the maneuvering member 5 can be varied in many different ways both with regard to the maneuvering principles and the geometrical shape. These and other variations that are obvious to the person of ordinary skill in the art are included in the patent claims.

The invention can also be used on tool shaft in the form of telescopically adjustable vacuum cleaner shafts that has an inner and outer tube shaped elements. Due to the requirement of a free passage of air through the inner element only locking member that affect the outer mantel surface of the inner element can be used in this application. The locking member that is dominating on the market is of a form locking type that takes advantage of impressed locking grooves on the inner element. This type of lock has many drawbacks. For example, the locking grooves constrain the air flow. Another drawback is that the locking grooves that cooperate with locking bodies that glide against the locking grooves during adjustment of the shaft length. This gives rise to a disturbing noise. Another drawback is that the shaft length can not be adjusted in an infinitely variable way. An addition drawback is that the form lock required that the inner and outer elements, respectively, are permanently fixed relative to one another with regards to the turning with the help of longitudinal grooves. It is thus not possible to adjust the angle between the inner and the outer elements which can be desirable because the vacuum cleaner hose if often connected to the vacuum cleaner shaft with the help of a bent tube that sometimes is in the way. An additional drawback is that the locking grooves as well as the longitudinal grooves are costly to produce.

These drawbacks are removed with the arrangement according to FIGS. 10-17.

The locking member, according to FIGS. 10 and 11 includes jaws 9 with inside friction surfaces 12, spring element 11 and attachment collar 10 that are substantially identical to the locking member described in WO 02/18802A1 according to FIGS. 2-5, 39-41 and 45. The difference is that the attachment collar 10 is extended with a flange that has an outer mantle surface that includes an axially directed guide groove 400 for an affecting member 7 according to FIGS. 12 and 13. The affecting member 7 is at one end provided with an extension 73 that is attached to a wedge 14. In its other end the affecting member 7 is attached to a maneuvering member 5 that is adapted to be shifted in an axial direction by the thumb of the operator. An outwardly protruding shelf 401 thus provides a support that forms a shape-dependent gripping surface so that the maneuvering member can be adjusted without any difficulty. The difference between the known techniques is also that the jaws 9 here includes outwardly directed lips 402 that are provided with oppositely directed wedge surfaces 203. These wedge surfaces 203 may be plane according to known techniques or be bent according to FIG. 10. These wedge surfaces 203 cooperate with outwardly directed wedge surfaces 204 on the wedge 14 in FIG. 12. Because the angle between the wedge surfaces 204, when using a suitable material, can be small according to the earlier description so that the required maneuvering force is so small that it can easily be achieved by the thumb of the operator. Bent wedge surfaces 203 make it possible to use varied wedge angle of the wedge 14. It can, for example, be desirable to have a greater wedge angle in the beginning of the maneuvering and a smaller wedge angle at the end of the maneuvering distance. This, a constant or a degressive maneuvering force may be obtained which may be desirable for ergonomic reasons. The sliding of the wedge 14 gliding between the outwardly directed jaws 402 means that the tangentially directed force derived from the wedge towards the jaws 9 affect on a bigger radius R, according to FIG. 11, compared to the situation when known techniques are used. In this way, a greater exchange of the maneuvering force compared to known techniques is achieved. The combination of the bigger radius, the suitable material selection and the smaller wedge angle make it possible to include an arrangement in the locking member where the exchange of the maneuvering force can be achieved without outer leverage arms or other outer force enhancing arrangements. This is particularly advantageous because the manufacturing is made simpler due to the fewer parts and lower tolerance requirements. Further, more freedom for use of difference control principles and different design shapes of the maneuvering member, such as a thumb controlled maneuvering member according to the description above. This is not obvious in view of known techniques.

FIG. 14 shows an outer element 3 inserted into the attachment collar 10 of the locking member 4 and is fixed to this attachment collar in a suitable way. The outer element 3 here includes an outer tube of a vacuum cleaner tube that is preferably turned downwardly to be connected to a vacuum cleaner nozzle. The inner element 1 is then turned upwardly towards the operator to be connected to a vacuum cleaner hose. The inner element 1 is inserted into the outer element 3 and is, as shown in FIG. 14, locked, in a known manner, to the jaws 9 of the locking member 4. The jaws 9 and the cooperating components are protected by the enclosing housing 71. Between the jaws 9 and the housing 71 is a space in which the wedge 14 and the attached components may glide. When it is desired to adjust the length of the vacuum cleaner shaft, the operator grips the outer mantle surfaces on the housing 71 and the attachment collar 10 and slides thereafter the maneuvering member 5 in the direction of the arrow K with the support of the outwardly protruding shelf 401, according to FIG. 15. The wedge 14 then glides between the outwardly directed lips 402 so that the jaws 9 are pressed to separate. The outer element 3 can thereafter be adjusted to a desired position in the directions of the arrows M and N relative to the inner element 1. This presumes that the operator firmly holds the inner element with the other hand which is a common way of adjusting the length of the vacuum cleaner tube.

FIGS. 16 and 17 show some other embodiments that are considered in connection with vacuum cleaner shafts. FIG. 16 shows a locking arrangement with a double directed wedge 14 that is attached to the inner mantle surface of the housing 71. When the operator grips the housing 71 and shifts it in the direction of the arrow K, the wedge 14 is also shifted in the direction of the arrow K. This, the lock is released and the outer element 3 glides, under the influence of the forces from the wedge surfaces, relative the inner element 1 in the same direction as the adjustment direction of the housing 71. The housing 71 here form the maneuvering member 5. This adjustment of the relative position of the outer element 3 relative to the inner element 1 can, thanks to the double directed wedge, be done in both directions. FIG. 17 shows an embodiment where the maneuvering member 5, when the lock is released, shifts in a direction towards the free end of the inner element 1. This, the inner element can be turned downwardly which sometimes is preferred in connection with vacuum cleaner shafts.

The invention has here been described in connection with vacuum cleaner shafts but can of course be used in completely different applications where an inner and an outer element can releasably be locked relative to one another.

In connection with applications of the invention on telescopically adjustable vacuum cleaner shafts are the embodiments in FIGS. 18-21 especially suitable.

The described combination of the invention of the locking member affecting the outer mantle surface of the inner element and the affecting member and the maneuvering member that is outside the outer element are very suitable for telescopically adjustable vacuum cleaner shafts. In this way the inner element can have a free passage for air while at the same time the mantle surface of the outer element does not have to be opened but can seal against the inner element. The inner element 1 can at its lower end be provided with a cone 403 or be prepared in another suitable way to receive a vacuum cleaner nozzle such as the nozzle 405 that has an extension 404 according to FIG. 20. At its upper portion the inner element 1 is suitably provided with a seal 408 that seals against the inner tube 302 according to FIG. 19. It is preferred that the seal is easily moved so that the inner element 1 falls down by its own weight at least with the help of the weight of the vacuum cleaner nozzle when the locking member 4 is released. The inner element 1 is thus shiftable inside the inner tube 302. In the lower part of the tube 302, a locking member 4 is attached. The locking member can releasably hold the inner element 1. In the upper part of the inner tube 302 a bent tube 406 may be inserted in a known manner. The bent tube 406 may suitably terminate into a vacuum cleaner hose 407. An affecting member in the form of an outer tube 301 partly encloses the inner tube 302 with a certain play. On the upper part of the tube 301 is a maneuvering member in the form of a pulling flange 5 arranged. The lower part of the tube 301 is connected to the locking member 4 so that the locking member 4 is opened when the tube 301 is pulled in the direction of the arrow K. Commonly available locking types on the market can be used as the locking member but it is preferred that a friction lock according to the invention is used. In this way the outer tube 301 can be attached to the housing 71. The housing 71 enclosed in this case the locking member 4 and is axially shiftable about the locking member with a certain play. A wedge 14 can be attached to the inner mantle surface of the housing 71, according to FIG. 16. In this application it is thus preferred that the wedge 14 is operatable in one direction so that the release of the locking member 4 can be achieved by an axial shift of the outer tube 301 in the direction of the arrow K. In the alternative, the extension 73 of the wedge 14, according to FIG. 12, be made more extended and be attached to the outer tube 301. In both cases, the locking member is released by the operator pulling the pulling flange 5 or the outer tube 301 upwardly, in the direction of the arrow K. This leads to the inner element being released and can be shifted in the direction of the arrows M. It is then also possible to rotate the inner element relative to the locking member 4. The wedge can of course also be turned, according to FIG. 17, so that the opening is done by the operator pressing the tube 301 in the direction that is opposite to the direction of the arrow K. This arrangement makes it possible to quickly and reliably adjust the length of the vacuum cleaner shaft without requiring the operator to bend down which is very desirable.

FIG. 21 shows a vacuum cleaner shaft where the affecting member 7 includes a bar that runs adjacent to the tube 302. The cross section of the bar can have geometry such that it partly encloses the tube 302. If the enclosing angle is more than 180 degrees the bar can be snapped onto the tube 302 which can be an advantage during assembly. The bar can also be shaped so that it includes one or many components that enclose the tube 302 more than 180 degrees and between these components have a smaller cross section. It is suitable that the maneuvering member 5 is attached to the upper part of the bar 7. In all embodiments the bar runs without much friction against the tube 302 during axial shifting in the direction of the arrow K. It has then the same function as the tube 301 but can be manufactured with less material. The advantage with a completely covered tube 301 is, as mentioned earlier, that the requirement of a surface treatment of the tube 302 is reduced and the tube 302 can be made of a thinner material.

Is it from many aspects suitable for telescopically shiftable elements with locking members that influence the outer mantle surface according to the above description. In certain case though it is desirable with a locking member that affects the inner mantle surface, according to FIGS. 22-47.

Figure 22:
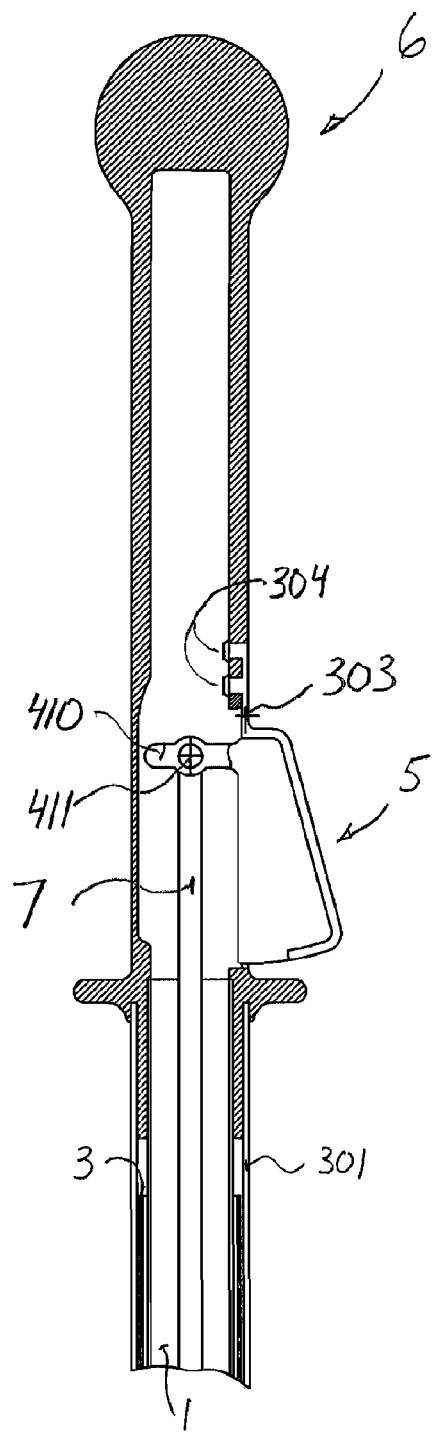
FIG. 22 shows a partial cross section of an upper part of a telescopically adjustable shaft.
Figure 23:
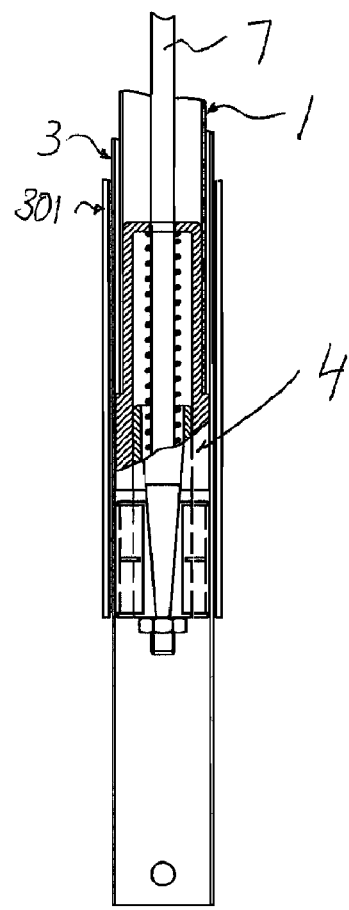
FIG. 23 shows a partial cross section of a lower part of the shaft according to FIG. 22.

The upper part shown in FIG. 22 and in FIG. 27 of the telescopically adjustable shaft includes a tube shaped handle 6 that has an opening on one side (to the right in the figure) into which the maneuvering member 5 is inserted. The maneuvering member 5 is partly shown as opened and has a gripping portion that has a U-shaped cross section. The upper part of the maneuvering member includes an extension 303 that has a peg shaped protrusions 304. These protrusions are snapped into the corresponding openings on the mantle surface of the handle 6. The maneuvering member 5 is manufactured by injection molded plastic and when a suitable material is selected the extension 304 can serve as a hinge according to the earlier description. The maneuvering member 5 includes also an arm 410 that is made from the same piece as the maneuvering member. The arm 410 is preferably provided with an opening to receive an upper hook shaped portion 411 on the bar shaped affecting member 7. This affecting member 7, preferably is made from a round bar of aluminum, is at its lower part connected to a locking member 4 at the lower part of the shaft according to FIG. 23.

The locking member 4 is now described in more detail with reference to the FIGS. 24, 25, 26 and 28. FIG. 24 shows a cylinder 413 that has an outer mantle surface that includes a rise in the form of a wedge 14. The cylinder 413 that is preferably made of an injection molded polyamide plastic is provided with an opening with a lower end to receive a compression spring. The lower end is provided with a smaller through put opening 429. The wedge equipped cylinder 413 is intended to cooperate with a sleeve 414 according to FIGS. 25 and 26. The sleeve 414 is preferably made of an injection molded acetal plastic and include at its upper part a tube shaped pole 417 that is intended to be inserted and be securely attached to an inner element 1. The pole 417 includes an upper end with a smaller through put opening 418. This end is intended to serve as a counterpart for a compression spring. The sleeve 414 includes also a tube shaped intermediate portion 428 which mantle surface is intended to serve as a guiding surface for the surrounding outer element 3. This intermediate portion 428 is broken up by a through put groove 416 which groove is intended to serve as a groove for the wedge 14. The sleeve 414 includes at its lower part a pair of jaws 9. The jaws are made in one piece with the sleeve 414 and are connected to the intermediate portion 428 via a relatively narrow neck 415. The jaws 9 are separated from each other by a wedge shaped groove 13 that forms oppositely directed wedge surfaces 203 on each jaw 9, respectively. In the sleeve 414 there is an axially directed opening arranged that runs from the lower end of the jaws 9 to the upper end of the pole 417. This opening is so shaped that the cylinder 413 can glide in it in an axial direction with a certain play. The jaws 9 include outer surface layers 12 of a suitable friction material. It is preferred that the surface layers 12 have rubber like material sprayed thereon that has a suitable hardness. A taped rubber layer can also be considered. The surface layers 12 only cover a portion of the circumference of the jaws 9 to make sure a free passage for the outer element 3 when the lock is released. The surface layers 12 also form a broken mantle surface to a cylinder which has an outer diameter that, in the unaffected position, is slightly smaller than the inner diameter of the outer element 3. To further ensure the free passage for the outer element 3 when the lock is released the jaws 9 can also include a ring shaped resilient element 11 that has a compressing effect. The element is put over the jaws 9 and down into the grooves at about half of the height of the jaws. The springing element 11 is mounted before the addition of the surface layers 12. During the mounting of the cylinder 413 the upper part of the cylinder 413 is inserted from below into the axially directed opening in the sleeve 414. When the wedge 14 is thus stopped by the jaws 9 they can spring outwardly so much that the cylinder 413 with its wedge 14 can pass so that the wedge 14 is fit into the tracks 13 and 416. The wedge 14 can possibly be provided with a suitable phase to make assembly easier.

FIG. 27 shows how the inner element 1 is inserted into an opening in the lower part of the handle 6 and permanently attached thereto in a suitable way. Further, the outer tube 301 is put over a throat in the lower part of the handle 6 and permanently attached with it. Between the tubes 1 and 301 the outer element can run when the lock is released. This release is adjusted with the help of the maneuvering member 5 via the pole shaped affecting member 7. FIG. 28 shows a completely assembled locking member 4 in a locked position. The assembly sequence is such that the compression spring 419 is inserted in the axially directed opening in the sleeve 414. Thereafter the cylinder 413 and its wedge 14 are inserted into the same opening according to the description above. The spring 419 is thus compressed. The pole shaped affecting member 7 can then be inserted from above through the opening 418 of the sleeve 414 and the opening 429 of the cylinder 413. The affecting member 7 can at its lower part be equipped with a threaded portion onto which a nut 420 can be screwed onto and be locked. The affecting member 7 is thus connected to the cylinder 413 and can influence this cylinder with an upwardly directed pulling force. Thereafter the affecting member 7 and the locking member 4 are inserted through the end of the inner element 1 far enough so that the upper edge of the intermediate portion 428 bears against the end of the inner element 1. The pole 417 on the sleeve 414 can now be secured against the inner element 1 in a suitable way such by using a press operation. In the next step the outer element 3 is inserted from above onto the inner element 1. The upper end of the outer element 3 can preferably be provided with a collar so that serve as a stop against the upper edge of the intermediate portion 428 to prevent the outer element 3 from being pulled out from the locking member 4 when the lock is released. As the next step the inner element 1 can be inserted into the intended lower opening of the handle 6 and be secured against this. Finally the outer tube 301 can be inserted from below on to the outer element 3 and be mounted on the lower part of the handle 6. The function of the locking member 4 is as follows. The compression spring 419 is compressed between the upper end of the pole 417 of the sleeve 414 and the lower end of the cylinder 413. The cylinder 414 and its wedge 14 are thus pressed downwardly. The wedge 14 operates against the wedge surfaces 203 on the jaws 9. Due to the low friction of the wedge surfaces and because of the small wedge angle, according to the earlier description regarding FIGS. 8 and 9, a great exchange of the spring force can be achieved. Because this exchanging force operates tangentially on the outer circumference of the jaws 9 an additional exchange is achieved by the spring force that is about π (pi) times compared to the inner cone of the jaws 9 with the same wedge angle. This means that the lock is very effective. Another advantage of the lock arrangement is the rubber like surface layer 12 forms a large surface which provides a large friction force. A large force absorbing surface means also that the compression of the surface layer 12 is negligible which results in a rigid lock with a small adjustment length. In other words, the locking force is increased from nothing to its maximum value by merely a small axial shift of the wedge 14. The relatively high locking force creates mainly pressure tensions in the jaws 9. The jaws 9 are only under insubstantial load with bending tension. It is therefore possible to dimension these jaws so that they can be made of a thermoplastic material and still withstand the load during a long time without creating function reducing plastic deformations.

FIGS. 29 and 30 show essential components of the shaft in the released position. The maneuvering member 5 is pressed by the operator against the handle 6 in the direction of the arrow J. The arm 410 is thus turned upwardly and thus pulls the hook shaped portion 411 upwardly on the pole shaped affection member 7. The portion 411 can then be rotatably fitted in the opening of the arm 410. During this rotation of the maneuvering member 5 the extension 303 is bent and thus functions as a hinge. If the extension is correctly dimensioned and is made of a suitable material, such as polypropylene can this happen without the risk of fatigue breakage. In the alternative, the maneuvering member 5 can be rotatably attached on the handle 6 in another way. Since the affecting member 7 in this way is pulled upwardly the cylinder 413 and the wedge 14 are pulled along with it. By this, the jaws 9 are pressed together under the influence of self tension in the plastic material of the jaws. If a ring shaped springing element 11 is mounted this can also contribute to the pressing together of the jaws 9. This leads to the surface layer 12 of the jaws 9 being released from the inner mantle surface of the outer element 3 with the consequence that the outer element 3 can be shifted in the axial direction to a desired position. Thereafter, the operator releases the maneuvering member 5 and the jaws 9 return in engagement with the outer element 3.

FIGS. 31, 32, 33, 34, 35, 36 show substantial components of an alternative embodiment of the locking member. It includes a sleeve 414, preferably made of an injection molded acetal plastic that has an upper tube portion 422 intended to be inserted into and be attached to the inner element 1. Further the sleeve 414 includes a tube shaped intermediate portion 428 that has a mantle surface that is intended to serve as a guiding surface against the surrounding outer element 3. The lower part of the sleeve 414 includes a tube 421 that has an outer mantle surface that includes a rise in the form of a wedge 14. A through penetrating groove 423 is arranged across the tube 421. The locking member further includes a tube shaped jaw 9 that is cut up with a lengthwise wedge shaped groove 13. The groove forms wedge surfaces 203 on the opposite surfaces of the jaw 9. The outer mantle surface of the jaw 9 includes a surface layer of a suitable friction material according to the earlier description. In this embodiment the surface layer 12 can extend around the entire circumference of the jaw 9 with the exception of the groove 13. The jaw 9 is suitably made of an injection molded polyamide that is possible glass reinforced. When the jaw is unaffected by external forces, the outer diameter of the surface layer 12 is smaller than the inner diameter of the outer element 3. The inner diameter of the jaw 9 is at the same time slightly larger that the outer diameter of the tube 421. The jaw 9 can thus freely glide on the tube 421 which tube then functions as guidance for the jaw so that no contact between the surface layer 12 of the jaw 9 and the inner mantle surface of the outer element 3 can occur. FIGS. 37 and 38 show a pulling pole 424, suitably made of injection molded plastic that has an upper loop 426 and a lower transverse beam 425.

FIG. 39 shows a mounted locking member 4 with the jaws 9 on the lower tube 421 of the sleeve 414 and fitted so that the wedge 14 grips into the wedge shaped groove 13. The pulling pole 424 is inserted through the opening of the tube 421 and turned so that the beam 425 runs in the groove 423. Thus the loop 426 can be pulled upwardly which leads to the beam 425 pulls the jaw 9 upwardly towards the wedge 14. The jaw 9 is then widened.

Figure 40:
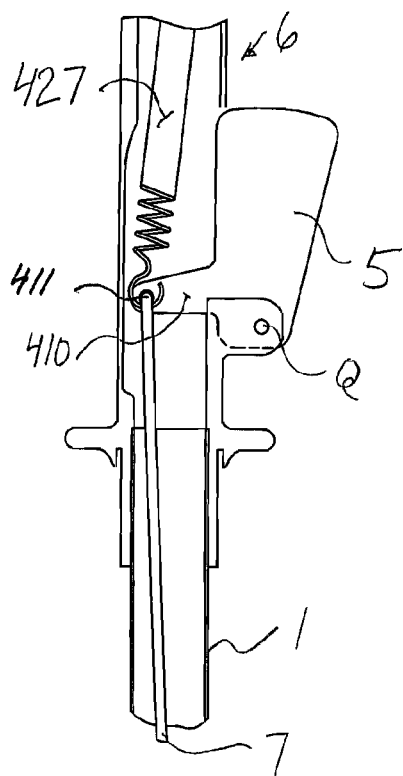
FIG. 40 is an opened side view showing the shortened shaft with the locking arrangement according to FIG. 39 in a locked position.
Figure 41:
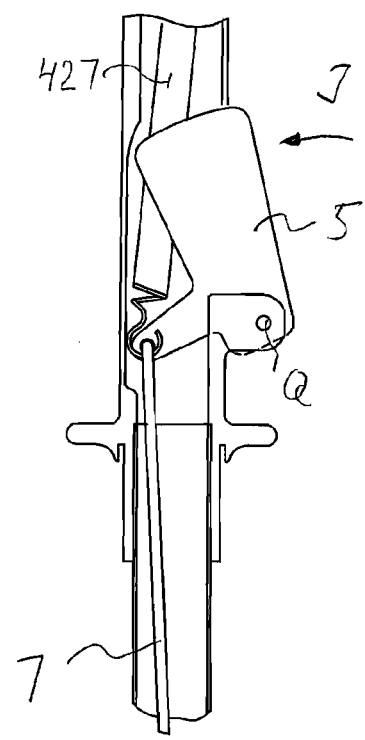
FIG. 41 is an opened side view showing an arrangement according to FIG. 40 in a released position.

FIG. 40 shows portions of a shaft with a locking member according to the above description. The upper tube portion 422 of the sleeve 414 is inserted and attached to the inner element 1. The inner element is attached to the handle 6, according to earlier description. An outer element 3 is, as earlier described, put on the locking member 4 and the inner element 1. For clarity no outer tube is shown in FIGS. 40 and 41. An affecting member 7 is at its lower end provided with a hook 412 that is inserted into the loop 426 of the pulling pole 424. The upper part of the affecting member 7 includes an upper hook 411 that in the same way as earlier is inserted into the intended opening in the arm 410 on the maneuvering member 5. The maneuvering member 5 is rotatably hung in the handle 6 in a known manner about the point of rotation Q. A pulling spring 427 is at its lower end hung on the hook 411. The upper end of the pulling spring 427 is attached to the handle 6 in a suitable way. The pulling spring 427 is pre-tensioned with a suitable force and is thus pulling the affecting member 7 upwardly. This result in the pulling pole 424 pulls the jaw 9 upwardly against the wedge 14 so that the jaw 9 locket the outer element 3 relative to the inner element 1. When the outer element 3 is influenced by a force in the direction of the arrow M, the jaws are pressed harder against the wedge 14. This leads to the lock being self locking against force in the direction of the arrow M which in certain application is advantageous. When exposed to forces on the outer element in a direction that is opposite the direction of the arrow M, the lock is opened when the force supersedes the pre-tension of the pulling spring 427. When the lock is released, the maneuvering member 5 is pressed in the direction of the arrow J according to FIG. 41. The affecting member 7, the pulling pole 424 and the jaw 9 are freed from the load of the spring force. The self tension in the jaw 9 will then influence the jaw 9 to regain its diameter when there is no load. Thus, the jaw will be centered about the lower tube 421 of the sleeve 414 and release the contact with the outer element 3. The position of the outer element 3 can then be adjusted in a desired way in the direction of the arrows M.

The above described embodiments of the invention can be applied to a wide range of applications where a telescopically adjustable function between two elements is desired. Examples of applications include cleaning shafts, sports equipment, painting shafts, boat hooks, garden tools etc.

Other embodiments of the self-locking locking member are shown in FIGS. 42-56.

FIGS. 42-45 show the substantial portions of an alternative embodiment of the locking member. It includes a sleeve 414, preferably made from injection molded acetal plastic, that has an upper tube portion 422 that is adapted to be inserted into and attached to an inner element 1. The sleeve 414 further includes a tube shaped middle portion 428 that has a mantle surface that is adapted to serve as a guiding surface against a surrounding outer element 3. The lower part of the sleeve 414 includes a tube 421 that has an outer mantle surface that includes a rise in the form of a wedge 14. A lower sleeve 430 can be put onto the lower portion of the tube 421. This sleeve 430, preferably made of an injection molded acetal plastic, includes a tube portion that has an inner mantle surface 431 that with a certain play can glide against the outer mantle surface of the tube 421.

The sleeve 430 further includes a wedge portion 14. The locking member further includes a tube shaped jaw 9, according to FIGS. 44 and 45, which is cut up along a lengthwise groove 13. The groove is wedge shaped at both ends and forms four wedge surfaces 203 on the surfaces of the jaw 9 that are turned towards one another. As distinguished from the jaw in FIG. 31, the outer mantle surface 433 of the jaw does not have to be equipped with any special surface layer. The jaw 9 as a whole may be made of one and the same material, such as injection molded polyamide and possibly be glass reinforced. When the jaw 9 is unaffected by external forces, the outer diameter of the mantle surface 433 is less than the inner diameter of the outer element 3. The inner diameter of the jaw 9 is at the same time slight greater than the outer diameter of the tube 421. The jaw 9 can thus freely glide on the tube 421 so that the tube functions to guide the jaw 9 so that no contact between the mantle surface 433 of the jaw 9 and the inner mantle surface of the outer element 3 occurs. FIGS. 42 and 43 also show a pulling rod 424 that is inserted through the sleeve 414 and through a bottom opening of the sleeve 430. The lower portion of the pulling rod 424 may be threaded and provided with a nut 432 threaded thereon. FIGS. 46 and 47 show a mounted locking member 4 and the jaw 9 being put over the lower tube 421 of the sleeve 414 and fitted so that the upper wedge 14 engages the upper wedge shaped groove 13. The lower sleeve 430 is thereafter put over the tube 421 and fitted so that the lower wedge 14 engages the lower wedge shaped groove of the jaw 9. The pulling rod 424 is mounted according to the description above. The arrangement according to FIG. 46 is in a locked position. This position is achieved by upwardly pulling the pulling rod 424 relative to the sleeve 414. This pulling movement can, as indicated earlier, be done under the influence of a spring. In this way, the lower sleeve 430 is pulled upwardly towards the sleeve 414. The wedges 14 are thus pressed into the wedge groove 13 of the jaw 9 so that the outer diameter of the jaw 9 is widened. The outer mantle surface 433 on the jaw 9 then come into contact with the inner mantle surface of the outer element 3. In this way, the jaw 9 locks the outer element 3 relative to the sleeve 414. The tube portion 422 of the sleeve is adapted to be secured on the inner tube 1 according to the earlier description. It requires a relatively small force to widen the jaw 9 so that a contact occurs between the inner mantle surface of the outer element 3. When the outer element 3 is exposed to forces in the direction N of the arrow relative to the sleeve 414, the jaw will be pressed harder against the upper wedge 14. The jaw then tends to be further widened that results in a more forceful locking. This occurs even if there is the same friction coefficient between the mantle surface 433 of the jaw and the inner mantle surface of the outer tube 3 as it is between the wedge surfaces 203 and 204 on the jaw 9 and the wedges 14, respectively. The reason is that the wedges 14 operate on the circumference of the jaw 9 in a tangential direction. This then results in, according to the earlier description, an exchange between the movement in the tangential direction and the movement in the radial direction with about π (pi) times. This means that it is easy to obtain a self locking lock between the jaw 9 and the outer tube 3 with a wedge angle that is sufficiently large to avoid any self locking of the wedges 14 in the wedge grooves 13. This leads to a very advantageous combination of characteristics of the locking member 4. The lock has a few simple components and can be engaged with smaller forces although no special friction material is required. During the exposure of the outer forces the locking force is increased according to the needs and returns to a low engagement force after being off loaded. In this way, there is no need to continuously load the component with large forces which is especially advantageous when thermoplastic materials are used in the included components. When the outer element 3 is exposed to a force in the O direction of the arrow relative to the wedge 414, the jaw will be pressed harder against the lower wedge 14. The jaw then tends to widen further resulting in a more forceful locking. The outer element 3 then pulls along the lower sleeve 430 as far as is permitted by the pulling rod 424 which can be a maximum compression of a compression spring. This means that the locking member 4 is self locking against movements in the O direction of the arrow with the exception of a certain play. The size of this play depends on the freedom of movement of the lower sleeve 430 in an axial direction. When a sufficiently large engagement force is used the locking member 4 can also be self locking against rotation because a rotation of the outer element 3 relative to the locking member 4 tends to widen the jaw 9 resulting in an increased locking force.

FIG. 47 shows the locking member in a released position. This position occurs by shifting the pulling rod 424 in the K direction of the arrow. Self tensioning in the jaw 9 will then affects the jaw 9 to return to its unloaded diameter. Thanks to the fact that the wedge angle can be relatively large the jaw can easily be pushed away from the wedges 14 with the help of the self tensioning in the material. The jaw 9 is then centered about the lower tube 421 of the sleeve 414 and disengages the contact with the outer element 3. The position of the outer element 3 can then be adjusted in a desirable way in the direction M of the arrows. The release obviously requires that the locking member 4 is first unloaded from the outer forces so that it is not in a self locking position.

Figure 48:
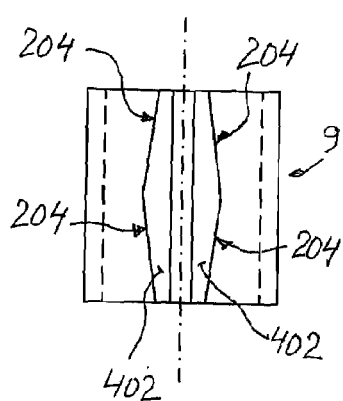
FIG. 48 is a front view of a clamping jaw with the outwardly directed wedge surfaces.
Figure 49:
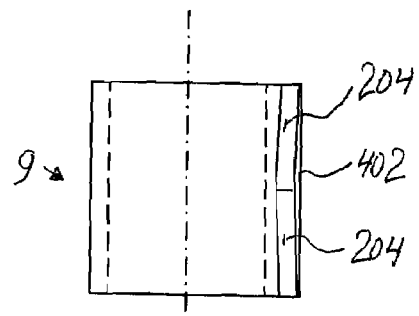
FIG. 49 is a side view of the clamping jaw according to FIG. 48 in a view position according to European drawing standards.
Figure 50:
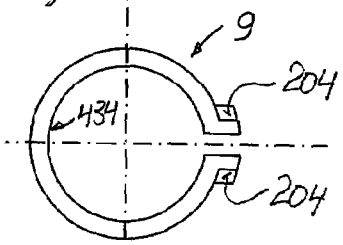
FIG. 50 is a view from above of a clamping jaw according to FIG. 48 in a view position according to European drawing standards.
Figure 52:
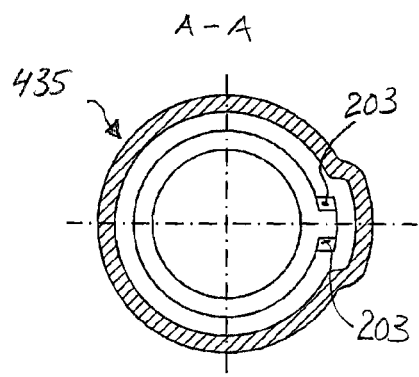
FIG. 52 is a cross section of the sleeve according to FIG. 51 along the cross sectional line A-A in a view position according to European drawing standards.
Figure 51:
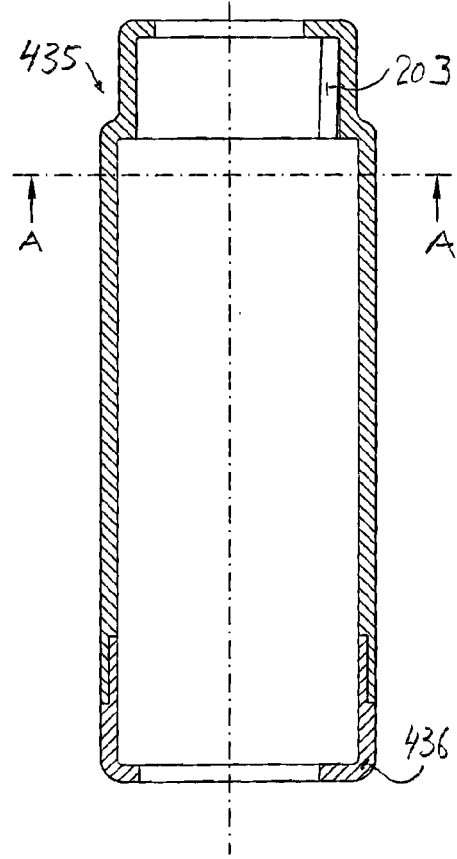
FIG. 51 is an opened side view of a lower sleeve with a lid.
Figure 53:
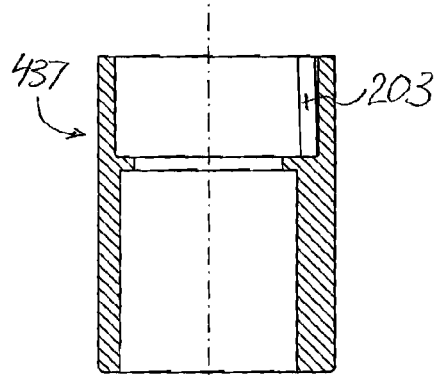
FIG. 53 is a cross section of the upper sleeve.
Figure 54:
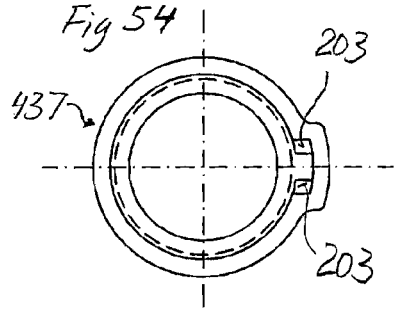
FIG. 54 is a view from above of the sleeve according to FIG. 53 in a view position according to European drawing standards.

FIGS. 48-50 show an alternative embodiment of a jaw 9. The jaw 9 is as described earlier cylindrical shaped and cut up along a lengthwise groove. On each side of the groove are outwardly directed lips 402 arranged. The lips include pairs of wedge surfaces 204 that are outwardly directed. The jaw 9 can as a whole be made by one and the same material such an injection molded polyamide and possibly be glass reinforced. When the jaw 9 is not affected by outer forces the inner diameter of the inner mantle surface 434 is slightly greater than the outer diameter of the inner element 1. In an unloaded condition, the outer mantle surface of the jaw 9 fits in the corresponding space in the lower sleeve 435 and the upper sleeve 437. These sleeves can be shaped according to FIGS. 51-54. These sleeves 435 and 437 include facing wedge surface 203 that can cooperate with the wedge surfaces 204 of the jaw 9 so that the jaw 9 is contracted when the sleeves are pressed against one another. A lid 436 can be attached to the sleeve 435 with a throughput opening for the outer element 3. This lid serves as a support for a compression spring.

FIG. 55 shows a mounted locking arrangement when the upper sleeve 437 is securely attach to the outer element 3 and where a jaw 9 is fitted into the space in the upper sleeve 437. The jaw 9 is so turned that the wedge surfaces 204 cooperate with the correspondingly facing wedge surfaces 203 on the upper sleeve 437. The lower sleeve 435 is put on from below and in a similar way as described above, is fitted so that each respective wedge surface 203 and 204 cooperates with one another. Further, a compression spring is mounted in a contracted condition between the lid 436 and the upper sleeve 437. Under the influence of the spring force, the sleeves are urged against each other and the wedge surfaces 203 cooperate with the wedge surfaces 204 of the jaw 9. This leads to that the jaw 9 is contracted so that the inner mantle surface 434 comes in contact with the outer mantle surface of the inner element 1. In this way, a self locking function is accomplished for movements in the N and O directions of the arrows of the inner element 1 relative to the outer element 3 similar to the above description according to FIGS. 42-47. FIG. 56 shows how the locking arrangement is released by pushing the sleeve 435 in the K direction of the arrow. In this way a space is created for the jaw 9 that, under the influence of the self tensioning of the material, can glide out of the wedge grooves in each respective sleeve so that the jaw 9 is widened and disengages the contact with the inner element 1. Thus, the inner element 1 can freely be shifted in the M direction of the arrows. This arrangement provides a self-locking locking function that engaged an outer mantle surface which can be advantageous in certain situations.

The invention claimed is:

1. A method for locking a first tube member relative to a second tube member, comprising:

providing a first tube member in operative engagement with a second member, a locking member having an axial slit defined therein, a first wedge member turned in a first axial direction and a second wedge member turned in a second axial direction that is opposite to the first axial direction;

telescopically moving the first tube member relative to the second tube member;

moving wedge members, to create a first distance between the first wedge member and the second wedge member, to engage the axial slit of the locking member so that the locking member is urged against the first tube member or the second tube member to lock the first tube member relative to the second tube member; and activating a maneuvering member to create a second distance between the first wedge member and the second wedge member to release the first tube member from the second tube member, the second distance being different from the first distance.

2. A method for locking a first tube member relative to a second tube member, comprising:

providing a first tube member in operative engagement with a second member, a locking member having an axial slit defined therein and a radial protrusion, a first wedge member turned in a first axial direction and a second wedge member turned in a second axial direction that is opposite to the first axial direction;

telescopically moving the first tube member relative to the second tube member;

moving wedge members, to create a first distance between the first wedge member and the second wedge member, to engage the radial protrusion of the locking member to compress the locking member so that an inner surface of the locking member is urged against the first tube member or the second tube member to lock the first tube member relative to the second tube member; and activating a maneuvering member to create a second distance between the first wedge member and the second wedge member to release the first tube member from the second tube member, the second distance being different from the first distance.

3. A method for locking a first tube member relative to a second tube meter, comprising:

providing a first tube member in operative engagement with a second member, a locking member having a wedge-shaped slit defined therein, a first wedge member turned in a first axial direction and a second wedge member turned in a second axial direction that is opposite to the first axial direction;

telescopically moving the first tube member relative to the second tube member; and moving wedge members, to create a first distance between the first wedge member and the second wedge member, to engage the wedge-shaped slit of the locking member to expand the locking member so that an outer surface of the locking member is urged against the first tube member or the second tube member to lock the first tube member relative to the second tube member; and activating a member to create a second distance between the first wedge member and the second wedge member to release the first tube member from the second tube member, the second distance being different from the first distance.

4. The method according to claim 3 wherein the method further comprises creating the first distance with a spring member.

5. The method according to claim 3 wherein the method further comprises providing the maneuvering member with a film hinge.

6. The method according to claim 3 wherein the method further comprises activating the maneuvering member by bending a bendable extension of the maneuvering member that is attached to the first or second tube member.

* * * * *